United States Patent
Shipley et al.

(10) Patent No.: US 9,916,764 B2
(45) Date of Patent: Mar. 13, 2018

(54) COMMON OPERATING ENVIRONMENT FOR AIRCRAFT OPERATIONS WITH AIR-TO-AIR COMMUNICATION

(71) Applicant: WxOps, Inc., Asheville, NC (US)

(72) Inventors: Scott T. Shipley, Satellite Beach, FL (US); Mark D. Spence, Montreat, NC (US)

(73) Assignee: WXPOS, INC., Asheville, NC (US)

( * ) Notice: Subject to any disclaimer, the term of this patent is extended or adjusted under 35 U.S.C. 154(b) by 0 days.

(21) Appl. No.: 15/614,042

(22) Filed: Jun. 5, 2017

(65) Prior Publication Data

US 2017/0270806 A1   Sep. 21, 2017

Related U.S. Application Data

(63) Continuation of application No. 15/336,411, filed on Oct. 27, 2016, now Pat. No. 9,672,747, which is a
(Continued)

(51) Int. Cl.
  *G08G 5/00* (2006.01)
  *G01C 23/00* (2006.01)
  *H04L 29/08* (2006.01)

(52) U.S. Cl.
  CPC .......... *G08G 5/0091* (2013.01); *G01C 23/00* (2013.01); *G08G 5/003* (2013.01); *G08G 5/0021* (2013.01);
(Continued)

(58) Field of Classification Search
  CPC .... G08G 5/0091; G08G 5/0021; G08G 5/003; G08G 5/0039; G08G 5/0052; G01C 23/00; H04L 67/12
  See application file for complete search history.

(56) References Cited

U.S. PATENT DOCUMENTS

| 4,642,775 A | 2/1987 | Cline et al. |
| 5,177,474 A | 1/1993 | Kadota |

(Continued)

OTHER PUBLICATIONS

Croft, John: "New Flight Deck Apps Help Pilots Avoid Turbulence", Aviation Week & Space Technology, Sep. 15, 2015.
(Continued)

*Primary Examiner* — Calvin Cheung
(74) *Attorney, Agent, or Firm* — Nath, Goldberg & Meyer; Jerald L. Meyer; Stanley N. Protigal

(57) ABSTRACT

A common operating environment (COE) display system for vehicle operations, such as for air transport provides coordination of logistics information with dispatch or a controller. An operational plan, such as a flight plan or other operational plan describing vehicle deployment is stored, and a map visualization system displays a map region. An in-vehicle display depicts the operational plan, providing displays of current and projected operational conditions of the vehicle within different time phases of the operational plan. Communication as either text or other data allows transmission can be performed as text, attachments or a combination of text and attachments. Messages (text) and attachments (files) are exchanged only through the server, and the items exchanged are recorded for analysis and forensic purposes.

19 Claims, 17 Drawing Sheets
(17 of 17 Drawing Sheet(s) Filed in Color)

Related U.S. Application Data continuation-in-part of application No. 15/183,304, filed on Jun. 15, 2016, now Pat. No. 9,564,055.

(60) Provisional application No. 62/246,993, filed on Oct. 27, 2015, provisional application No. 62/175,659, filed on Jun. 15, 2015, provisional application No. 62/180,447, filed on Jun. 16, 2015.

(52) U.S. Cl.
CPC ......... *G08G 5/0039* (2013.01); *G08G 5/0052* (2013.01); *H04L 67/12* (2013.01)

(56) References Cited

U.S. PATENT DOCUMENTS

| | | | |
|---|---|---|---|
| 5,265,024 | A | 11/1993 | Crabill et al. |
| 5,361,349 | A | 11/1994 | Sugita et al. |
| 5,490,239 | A | 2/1996 | Myers |
| 5,528,735 | A | 6/1996 | Strasnick et al. |
| 5,592,599 | A | 1/1997 | Lindholm |
| 5,923,324 | A | 7/1999 | Berry et al. |
| 5,926,179 | A | 7/1999 | Matsuda et al. |
| 5,999,185 | A | 12/1999 | Kato et al. |
| 6,014,606 | A | 1/2000 | Tu |
| 6,075,536 | A | 6/2000 | Kunieda et al. |
| 6,184,860 | B1 | 2/2001 | Yamakawa |
| 6,199,008 | B1* | 3/2001 | Aratow .......... G01C 23/00 701/120 |
| 6,247,019 | B1 | 6/2001 | Davies |
| 6,281,899 | B1 | 8/2001 | Gould et al. |
| 6,330,356 | B1 | 12/2001 | Sundareswaran et al. |
| 6,401,102 | B1 | 6/2002 | Ishii et al. |
| 6,437,794 | B1 | 8/2002 | Ohshima et al. |
| 6,441,773 | B1 | 8/2002 | Kelly et al. |
| 6,501,392 | B2 | 12/2002 | Gremmert et al. |
| 6,578,090 | B1 | 6/2003 | Motoyama et al. |
| 6,734,884 | B1 | 5/2004 | Berry et al. |
| 6,765,567 | B1 | 7/2004 | Roberson et al. |
| 6,798,407 | B1 | 9/2004 | Benman |
| 6,972,757 | B2 | 12/2005 | Arikawa et al. |
| 6,977,608 | B1 | 12/2005 | Anderson et al. |
| 7,027,898 | B1 | 4/2006 | Leger et al. |
| 7,039,505 | B1 | 5/2006 | Southard et al. |
| 7,043,695 | B2 | 5/2006 | Elber et al. |
| 7,109,913 | B1 | 9/2006 | Paramore et al. |
| 7,148,887 | B2 | 12/2006 | Kaufman et al. |
| 7,161,525 | B1 | 1/2007 | Finley et al. |
| 7,190,378 | B2 | 3/2007 | Sauer et al. |
| 7,205,928 | B1 | 4/2007 | Sweet |
| 7,212,200 | B2 | 5/2007 | Fujita et al. |
| 7,250,944 | B2 | 7/2007 | Anderson et al. |
| 7,299,256 | B2 | 11/2007 | Pradhan et al. |
| 7,383,131 | B1 | 6/2008 | Wey et al. |
| 7,394,459 | B2 | 7/2008 | Bathiche et al. |
| 7,427,943 | B1 | 9/2008 | Kronfeld et al. |
| 7,475,357 | B2 | 1/2009 | Takeuchi et al. |
| 7,479,967 | B2 | 1/2009 | Bachelder et al. |
| 7,492,362 | B2 | 2/2009 | Sakagawa et al. |
| 7,505,048 | B2 | 3/2009 | Su |
| 7,612,688 | B1 | 11/2009 | Vigeant-Langlois et al. |
| 7,633,428 | B1 | 12/2009 | McCusker et al. |
| 7,646,328 | B2 | 1/2010 | Makkapati et al. |
| 7,692,649 | B2 | 4/2010 | Elsberg et al. |
| 7,821,448 | B2 | 10/2010 | Mahapatra et al. |
| 7,974,461 | B2 | 7/2011 | England et al. |
| 8,132,122 | B2 | 3/2012 | Risch et al. |
| 8,874,288 | B1* | 10/2014 | Siddiqui .......... G01C 23/00 701/1 |
| 2003/0020707 | A1 | 1/2003 | Kangas et al. |
| 2003/0080975 | A1 | 5/2003 | Kuroki et al. |
| 2003/0098863 | A1 | 5/2003 | Fujita et al. |
| 2003/0234782 | A1 | 12/2003 | Terentyev et al. |
| 2004/0036721 | A1 | 2/2004 | Anderson et al. |
| 2004/0133552 | A1 | 7/2004 | Greenfield et al. |
| 2005/0028111 | A1 | 2/2005 | Schrag et al. |
| 2005/0108374 | A1 | 5/2005 | Pierzga et al. |
| 2005/0131857 | A1 | 6/2005 | Fujiki et al. |
| 2006/0004512 | A1 | 1/2006 | Herbst et al. |
| 2006/0041340 | A1 | 2/2006 | Stefani |
| 2006/0112346 | A1 | 5/2006 | Miksovsky et al. |
| 2006/0117267 | A1 | 6/2006 | Koraiski et al. |
| 2006/0200662 | A1 | 9/2006 | Fulton et al. |
| 2006/0238383 | A1 | 10/2006 | Kimchi et al. |
| 2006/0250322 | A1 | 11/2006 | Hall et al. |
| 2007/0183430 | A1 | 8/2007 | Asmussen |
| 2007/0266019 | A1 | 11/2007 | Lavi |
| 2007/0266029 | A1 | 11/2007 | Baskey et al. |
| 2008/0059889 | A1 | 3/2008 | Parker et al. |
| 2008/0068379 | A1 | 3/2008 | Larsen et al. |
| 2008/0071770 | A1 | 3/2008 | Schloter et al. |
| 2008/0141127 | A1 | 6/2008 | Yamanoto et al. |
| 2008/0195309 | A1* | 8/2008 | Prinzel, III .......... G01C 23/00 701/532 |
| 2008/0309874 | A1 | 12/2008 | Zuccolotto et al. |
| 2008/0312987 | A1 | 12/2008 | Damodaran et al. |
| 2009/0009516 | A1 | 1/2009 | Tsao |
| 2009/0153550 | A1 | 6/2009 | Keaney et al. |
| 2009/0198767 | A1 | 8/2009 | Jakobson et al. |
| 2009/0273510 | A1 | 11/2009 | Tillotson |
| 2009/0319175 | A1 | 12/2009 | Khosravy et al. |
| 2009/0327071 | A1 | 12/2009 | Kreft |
| 2010/0079342 | A1* | 4/2010 | Smith .............. G01H 17/00 342/451 |
| 2010/0094487 | A1 | 4/2010 | Brinkman |
| 2010/0131126 | A1 | 5/2010 | He et al. |
| 2010/0152924 | A1 | 6/2010 | Pandit et al. |
| 2010/0177120 | A1 | 7/2010 | Balfour |
| 2010/0245164 | A1 | 9/2010 | Kauffman |
| 2010/0262318 | A1 | 10/2010 | Ariens |
| 2010/0299630 | A1 | 11/2010 | McCutchen et al. |
| 2010/0302094 | A1 | 12/2010 | Bunch et al. |
| 2010/0311354 | A1 | 12/2010 | Stayton et al. |
| 2011/0238239 | A1 | 9/2011 | Schuler et al. |
| 2012/0245836 | A1* | 9/2012 | White ............ G08G 5/065 701/120 |
| 2013/0085661 | A1* | 4/2013 | Chan ............. G05D 1/104 701/122 |
| 2014/0058675 | A1 | 2/2014 | He et al. |
| 2014/0210648 | A1* | 7/2014 | Samuthirapandian ............ G08G 5/0008 340/961 |
| 2015/0355832 | A1* | 12/2015 | Dostal .............. G06F 3/04855 715/771 |

OTHER PUBLICATIONS

Byers, Horace R., et al. "Thunderstorm Structure and Circulation", Journal of Meterology, vol. 5, No. 3, Jun. 1948.

Ching, J.K.S., et al. "Evidence for Cloud Venting of Mixed Layer Ozone and Aerosols", Atmospheric Environment, vol. 22, No. 2, pp. 225-242, 1988.

Cornman, Larry B., et al. "An Update on the FAA Aviation Weather Research Program's in Situ Turbulence Measurement and Reporting System", 11th Conf. on Aviation, Range and Aerospace Meteorology, Hyannis, MA, Amer. Meteor. Soc. 2004.

Draxler, Roland R. "Hysplit_4 User's Guide", NOAA Technical Memorandum ERL ARL-230, NOAA Air Resources Laboratory, Silver Spring, Maryland, Jun. 1999.

Ellrod, Gary P., et al. "Improvements to an Operational Clear-Air Turbulence Diagnostic Index by Addition of a Divergence Trend Term", Weather and Forecasting, vol. 25, No. 2, pp. 789-798, Apr. 2010.

Ferguson, Howard L., "Mathematical and Synoptic Aspects of a Small-Scale Wave Disturbance Over the Lower Great Lakes Area", J. Appl. Meteor., vol. 6, pp. 523-529, Jun. 1967.

Kaplan, Michael L., "Characterizing the Severe Turbulence Environments Associated With Commercial Aviation Accidents", Part I:44 Case Study Synoptic Observational Analyses; NASA/CR-2002-211918, Aug. 2002.

(56) References Cited

OTHER PUBLICATIONS

Lane, Todd P., et al. "Recent Advances in the Understanding of Near-Cloud Turbulence", American Meteorological Society, pp. 499-515, Apr. 2012.
Lin, Yuh-Lang, et al. "A study of a mesoscale Solitary Wave in the Atmosphere Originating near a Region of Deep Convection", Journal of the Atmospheric Sciences, vol. 45, No. 2, pp. 194-205, 1988.
Wagner, A. James, "Gravity Wave Over New England, Apr. 12, 1961", Monthly Weather Review vol. 90, pp. 431-436, Oct. 1962.
Knox, John A., et al. "Verification of Clear Air Turbulence (CAT) Forecast Indices During Two Winters", The University of Gerogia, COMET, P3.22, work funded by UCAR/COMET, 2009-2010.
"Transported Turbulence during Climb, Cruise and Descent", WxOps, SBIR Report 2015-1 A3.03-8717, Dec. 17, 2015.
"Transported Turbulence during Climb, Cruise and Descent, Phase I Project", SBIR/STTR Programs, Space Technology Mission Directorate (STMD), TechPort, NASA, printed Jun. 10, 2016.
Ellrod, G. P., J. A. Knox, P. F. Lester, and L. J. Ehernberger "Clear Air Turbulence", In: Gerald R. North (editor-in-chief), John Pyle and Fuqing Zhang (editors). Encyclopedia of Atmospheric Science, 2nd Edition, Academic Press, Elsevier, Inc., vol. 1, pp. 177-186, 2015.
Seiler, Wolfgang, et al. "The Distribution of Carbon Monoxide and Ozone in the Free Troposphere", Journal of Geophysical Research, vol. 86, No. C8, pp. 7255-7265, Aug. 20, 1981.

\* cited by examiner

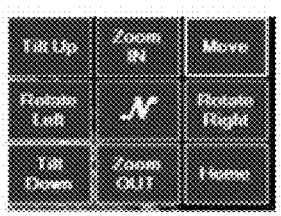  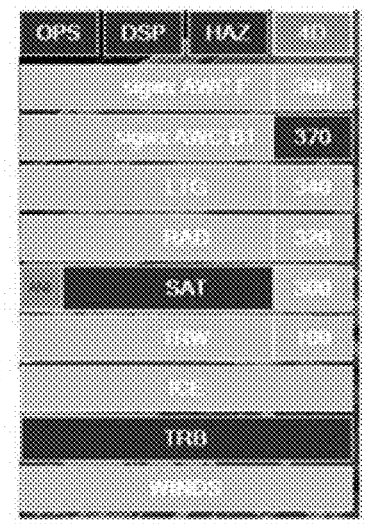
*Fig. 17A*     *Fig. 17B*     *Fig. 17C*
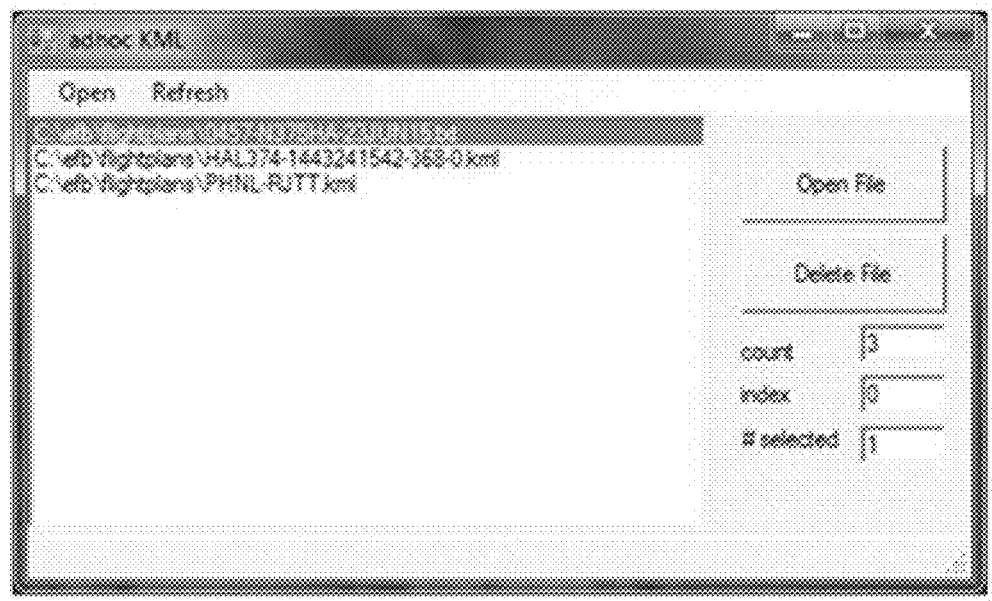
*Fig. 18*

COMMON OPERATING ENVIRONMENT FOR AIRCRAFT OPERATIONS WITH AIR-TO-AIR COMMUNICATION

RELATED APPLICATIONS

The present patent application is a continuation of U.S. patent application Ser. No. 15/336,411, filed 27 Oct. 2016, now U.S. Pat. No. 9,672,747, which claims priority to U.S. Provisional Patent Application No. 62/246,993 filed 27 Oct. 2015, No. 62/175,659 filed Jun. 15, 2015, and No. 62/180,447 filed Jun. 16, 2015, and is a Continuation in Part application of U.S. patent application Ser. No. 15/183,304, filed Jun. 15, 2016, now U.S. Pat. No. 9,564,055, which are incorporated by reference herein.

BACKGROUND

Field

The present disclosure relates to visualization and analysis of the atmospheric and operational environment related to aircraft flight operations with the goal of improving air transport safety and fuel efficiency. The disclosure also applies to other transportation industries, including marine, land-based and space-based vehicles.

Background

The disclosed technology provides communications and coordination of flight operations between Dispatch and Flight personnel over long distances, such as across the vast areas of the Pacific Ocean. One limitation for operations in remote environments is reliability of the communication network, which may be noisy, interrupted or not available for extended periods. Another factor which limits communication is the expense of the communication network, which may be cost prohibitive for high bandwidth communication.

Electronic Flight Bag (EFB) equipment is used in cockpits as now allowed by US Federal Aviation Administration (FAA) regulations. The techniques described herein provide user tracking of long-range air transport and apply to Dispatch and EFB applications, both on the ground and in flight. The Common Operating Environment (COE) approach reduces error of interpretation and user workload both on the ground and in the cockpit. The techniques can also be used in Extended Operations (ETOPS, an FAA requirement for alternate landing sites in event of depressurization or engine failure).

One issue with flight plans is that, in many cases, changes in the flight plan must be approved by the controlling authority. In airline operations under (US) FAA CFR 14 Part 121, the controlling authority typically is a licensed flight dispatcher ("dispatcher") who is jointly responsible with the pilot in command for the operation of the flight. Certain deviations from the original flight plan must be approved by the dispatcher prior to effecting those changes. Another issue is that information kept on board the aircraft, including information stored in an EFB, must be current. Additional information, such as SIGMETs and NOTAMs, must also be current, which is difficult to achieve while in flight.

SUMMARY

A common operating environment (COE) display system for vehicle operations providing coordination of logistics information among transportation elements used in remote operations. The COE has an operational plan store for storing data for a vehicle operational plan such as a flight plan or other operational data describing vehicle deployment. A map visualization system has a capability of storing and displaying a visualization of a map region. An in-vehicle display depicts the operational plan, providing displays of current and projected operational conditions of the vehicle and its environment within different time phases of the operational plan. The in-vehicle display comprises a map visualization output providing said visualization of the map region, and is capable of generating and displaying a mapped representation of the operational plan and logistics on the visualization of the map. A corresponding display is provided at a controller station, remote from the vehicle.

A synchronization module comprising a data communication portal, provides a capability of providing and receiving updates of the operational plan. The updates provide changed data to the operational plan without replacing substantial portions of the stored data for the operational plan, which allows synchronization of the operational plan between the in-vehicle display the control facility. This permits a controller or dispatcher function at a vehicle operations controller facility or dispatch controller facility to screen share with the in-vehicle display based on information previously stored, as updated by the updates.

Operational plan modification may be performed by generating a new or modified operational plan or modifying the stored data for the vehicle operational plan. The synchronization module provides the new or modified operational plan or modifications of the stored data to the remotely located control facility, permitting review of the new or modified operational plan.

The operator of the in-vehicle display is able to forward communication of text or other data allows transmission to other vehicles by transmitting the data to the remotely located control facility, the forwarded communication selectively comprising text, attachments or a combination of text and attachments.

In a further aspect, an in-vehicle display providing a visualization system configured to communicate and synchronize with a remotely located controller. The in-vehicle display depicts an operational plan, providing displays of current and projected operational conditions of the vehicle within different time phases of the operational plan. A map visualization output is used to provide visualization of the map region, and is capable of generating and displaying a mapped representation of the operational plan on the visualization of the map. The in-vehicle display acquires a route or flight track as a focus object, and at least one predicted object or occurrence as a predicted focus object. The focus object information is used to display the focus objects and subdivide each focus object into a plurality of object components. A transparent interface is used to calculate coordinates of components of the focus object in a coordinate system of the visualization system. The focus object is mutually shared by the visualization system and the interface. Coordinates of a point of interest (POI) are received and used in a projection of the visualization system. The POI is projected in a selected point of view (POV) using the calculated coordinates and the received coordinates of the POI in the projection of the visualization system of N-dimensional features in the visualization, independent of user point of view and time-adjusted according to current and predicted flight status along the flight track and adjusted by time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 10A shows a "publishing" linkage. FIG. 10B shows a TechPubs display used at a dispatcher station. FIG. 10C shows a CID view.

FIG. 11B depicts a detailed listing for TechPubs, looking at the "Emergency" category.

FIG. 11C depicts CID document actions in a detailed listing for CIDS, looking at the "Common Manuals" category.

FIG. 16A shows a local high speed data link such as WiFi. FIG. 16B indicates data transfer or processing is occurring. FIG. 16C indicates connection is with a restricted bandwidth link.

FIG. 16D indicates no communication link. FIG. 16E shows a data entry or selection menu.

FIGS. 17A-C are representations of expanded control UI menus for the CID, showing the CID's animation player with expanded controls. FIG. 17A shows the NAV UI. FIG. 17 B shows a function in which the animation player is toggled by selecting the play/pause button. FIG. 17C shows a layers panel in which 4-dimensional layers are selected and selected layer visibilities are ON.

FIG. 18 is a representation of an ad hoc UI, showing "ad hoc" files downloaded from the Dispatch Operations server.

DETAILED DESCRIPTION

Overview

Figure 1:
FIG. 1 is a depiction of a tablet computer displaying a geobrowser.

The system and method for coordinating logistics information among transport elements is designed for exchange of weather, environmental, performance and logistics information between Dispatch and Flight personnel for long-haul flight operations over the vast areas of the Pacific Ocean. Developed initially to support Hawaiian Airlines Dispatch Operations, the system and method disclosed will benefit operations in transportation industries applications beyond commercial aviation, including shipping, land-based vehicular traffic, and space operations. The principal limitations for operations in remote environments are reliability of the communication network, which may be noisy, interrupted or not available for extended periods, and expense of the communication network, which may be cost prohibitive for higher bandwidths. The disclosed system and method constrains bandwidth costs by transmitting unique information only once and storing that information on the target computer platform for reuse, keeping that information available for when network connectivity is interrupted or lost. The technique embraces 2-way encrypted transmission of information, allowing transmission to multiple remote platforms from a central repository, as well as remote platform transmission to a central repository for analysis and creation of new composite program products. Logistics coordination is achieved using a suite of interconnected tools supporting 1) Program product generation, 2) Communication, 3) Monitoring, 4) Measurement, Analysis and Editing, and 5) Display and Animation using virtual globes or geobrowsers. Any spatial or temporal confusion when comparing or contrasting data program products is eliminated by displaying and analyzing all data objects in a Common Operating Environment (COE) using the identical projection. The recurring data synchronization process reports information from the remote platforms for analysis and generation of derived composite program products on the ground. Such derived program products can be retransmitted to the remote platform as needed for situational awareness.

"Data" as used herein can comprise digital data, as well as text data such as ASCII data and other forms of data which can be either directly readable or primarily machine readable.

The disclosed technology provides a Common Operating Environment (COE) capability using 4-dimensional (4-D) geobrowser based software to support an Electronic Flight Bag (EFB) solution for commercial airlines. The EFB as specified comprises a best in field Class II EFB which will extend its FAA Advisory Circular AC 120-42 approved Dispatch Operations to flight crews using mobile tablet devices. The disclosed technology is used to provide existing flight information services to an airline dispatch operation for integration of weather and flight management logistics information in the geobrowser-based COE. The EFB is a 4-dimensional time management system for data presentation and analysis, providing animations of collocated weather observations and model-derived program products in 3 dimensions. This approach reduces the number of independent displays needed to convey flight environment conditions to one integrated display. Flight hazards along planned flight paths are quickly recognized, and human error associated with integration of multiple visualizations in various projections, valid times, and formats is reduced. Hawaiian Dispatch, for example, already provides the 4-dimensional flight briefings to air crews, and the tablet EFB supports updates and information exchange between Dispatch and Pilots en route. The EFB provides 3-dimensional and 4-dimensional animation capabilities in the cockpit for any data set or Keyhole Markup Language (KML) program product that may be used or produced on the ground by or for Hawaiian Dispatch Operations, within the bandwidth limitations imposed by ISP or Satellite Communications providers. The EFB allows Hawaiian to prioritize and control the transmission of data and program products to aircraft en route, thereby conserving bandwidth and lowering overall communications costs. Where feasible, program product transmission is delayed to take advantage of lower cost ground ISP communications. Time sensitive program products are transmitted once and stored in local EFB cache, allowing continuous EFB operations en route under conditions of unreliable internet connectivity. Although internet connectivity may become reliable in the future, the internet cannot be guaranteed to be "always ON" over vast areas of the Pacific.

The EFB provides some original features which will further reduce costs and enhance performance. The EFB User Interface (UI) style is controlled by configuration tables, which allows Hawaiian to modify many look and feel aspects of the EFB after delivery without software modification. Simple touch controls are provided to enable common geobrowser operations and reduce the complexity of the 4-dimensional applications with the fewest possible "clicks" or steps. An animation widget allows and controls the animation time window independent of geobrowser native behaviors. This 4-dimensional capability improves the handling of time across multiple Keyhole Markup Language (KML) products or layers.

The EFB incorporates the WxAzygy® Transparent Interface (U.S. Pat. No. 8,392,853) for measurement and KML creation in a 4-dimensional geobrowser Common Operating Environment. Users can query the location and content of data displayed in 4-dimensional regardless of their Point Of View (POV). The WxAzygy® innovation also allows for manual KML creation and measurements on selected 3-dimensional surfaces, which is useful in updating flight plans in the neighborhood of hazards to flight which are elevated in height.

Operation

The disclosed technology minimizes bandwidth costs by transmitting unique information only once and storing that information on the target computer platform, and also by processing and producing derived data program products on the target computer platform. The information is subsequently available for use on the target platform when network connectivity is interrupted or lost. The technique embraces the 2-way transmission of information, allowing for transmission of information from a central repository to remote platforms, as well as transmission of information obtained by the remote platform to a central repository. In this manner, two-way communication between any two or more connected platforms can be accomplished, supporting "air to air" transfer of messages and files, routed through a central repository.

For spatial information, any confusion in location when comparing or contracting program products is eliminated by displaying and analyzing all data objects in a Common Operating Environment (COE) using the identical projection. This is typically the geobrowser spheroidal coordinate system based upon the WGS84 Datum for Earth operations, or other unified coordinate system as appropriate.

FIG. 1 is a depiction of a tablet computer displaying a geobrowser. The depiction shows a tablet computer displaying a geobrowser, comprising a Personal Interactive Device (PID). The tablet computer (PID and CID in FIG. 2) allows touch-friendly controls which allow a pilot to interact with a geobrowser such as Google Earth™.

The tablet computer allows touch-friendly controls which allow a pilot to interact with a geobrowser such as Google Earth™ or NASA WorldWind. The present disclosure uses a COE, which in the form of an EFB is called OpsTablet®, which uses the Google Earth™ COM API geobrowser on Microsoft Windows® platforms. The WxOps OpsTablet® software is configured to support hand-held Personal Interactive Device (PID) tablets for pre-flight, and installed Cockpit Interactive Device (CID) tablets for flight operations.

Figure 2:
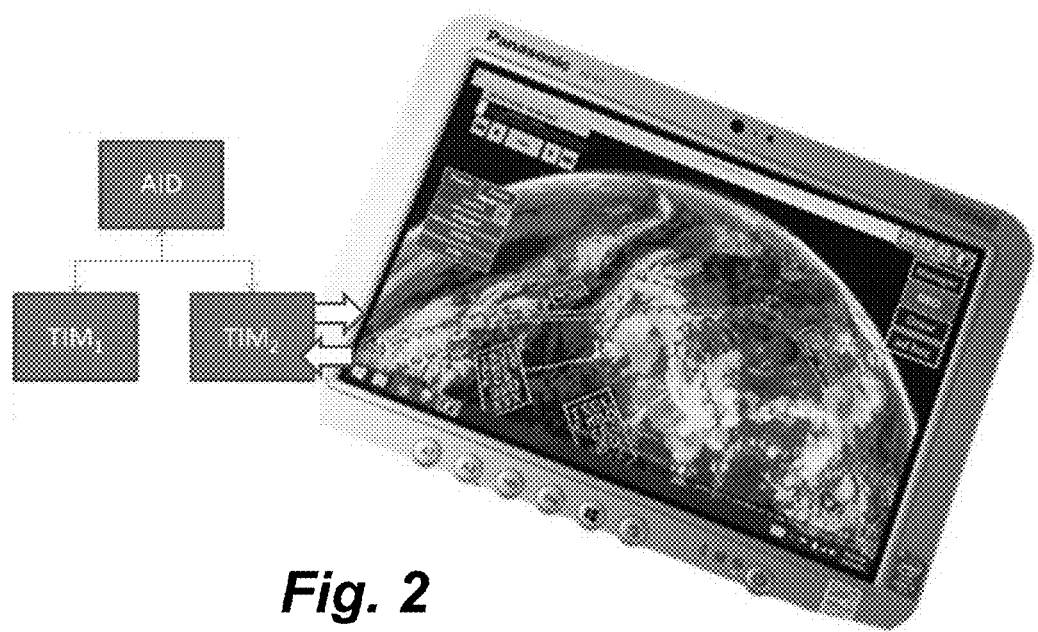
FIG. 2 is a schematic diagram showing a cockpit interactive device (CID) platform.

FIG. 2 is a schematic diagram showing a cockpit interactive device (CID) platform. The CID platform has a functional connection to Inmarsat SwiftBroadBand satellite data service through the UTAS AID and TIM interfaces. The tablet computer (CID or PID in FIG. 1) allows touch-friendly controls which allow a pilot to interact with a geobrowser such as Google Earth™.

Figure 3:
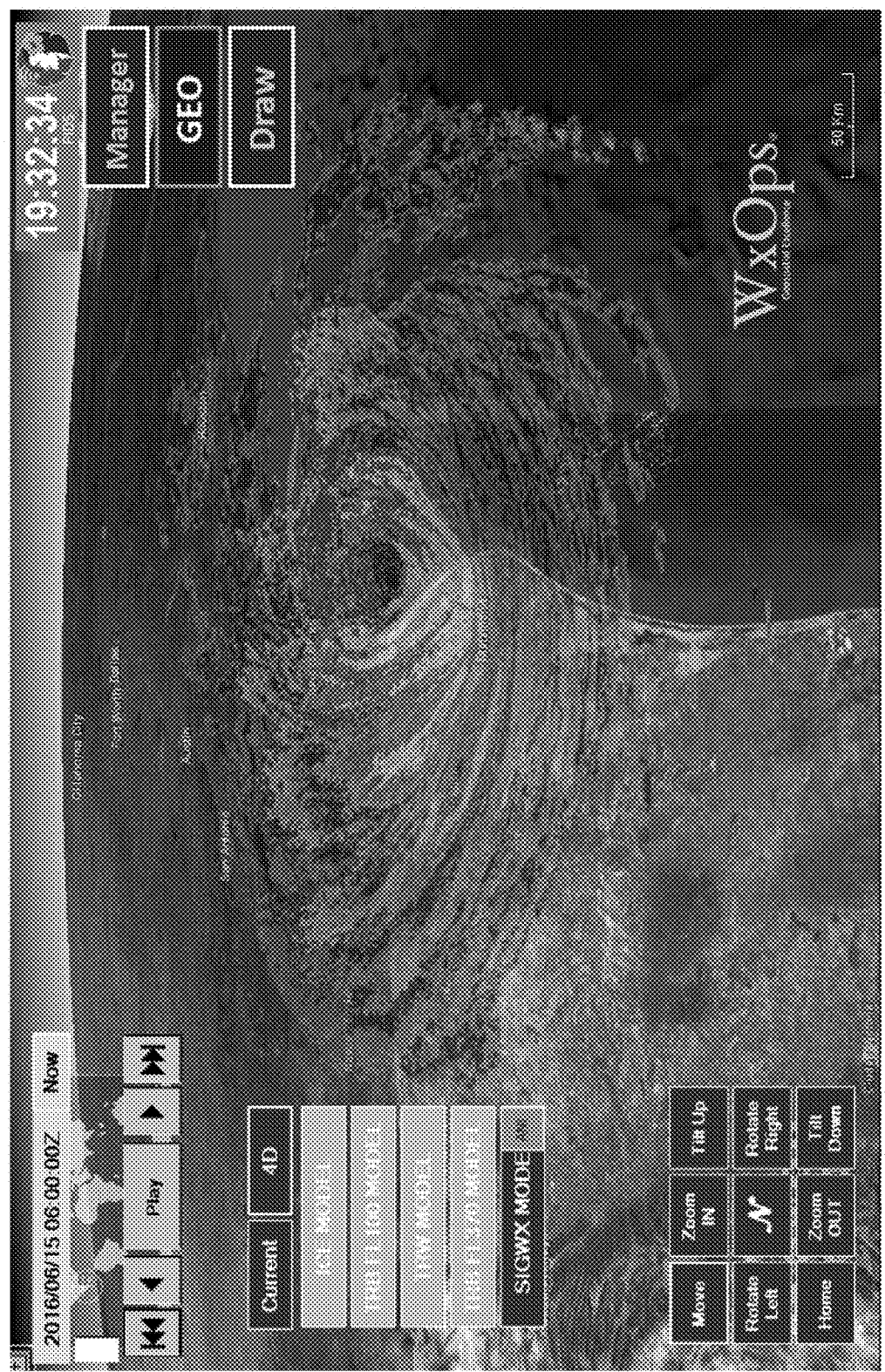
FIG. 3 is a representation of a display used on the CID depicting a central dense overcast (CDO) disturbance.

In addition to Google Earth™, the disclosed technology can work with other geobrowsers, such as a COM API version of the NASA WorldWind geobrowser. FIG. 3 is a representation of a display used on the CID or PID depicting a central dense overcast (CDO) disturbance (Hurricane Dolly, 2008) on the NASA WorldWind geobrowser. The display provides a uniform UI across pilot/dispatcher (PID) and aircraft (CID) Electronic Flight Bag (EFB) systems. An effort has been made to present the same User Interface (UI) and functionality to the pilot on both the PID and CID devices, to minimize differences as pilots transition from pre-flight to cockpit operations. The primary differences between PID and CID are internet connectivity and bandwidth cost. The CID currently uses Inmarsat SwiftBroadBand for bi-directional satellite communication during flight operations on Hawaiian's fleet of A330, B717 and B767 aircraft.

Logistics coordination is achieved using a suite of interconnected tools:

1. Communication Tools—The EFB relies on a vehicle pre-departure and enroute data retrieval and storage system to achieve sustained operations in a non-connected or intermittently connected environment. This component is also known as the "Gopher" module in the COE.
2. Monitor Tools—A still or animated graphical depiction of a vehicle's current or projected position, fuel, route, waypoints, destination and alternates. The Monitor Tool provides the ETA (Estimated Time of Arrival), EFA (Estimated Fuel at Arrival) and EWA (Estimated Weather at Arrival) at each point. ETA/EFA/EWA projections or re-projections include but are not limited to the following data variables:
    ETA/EFA—Departure time, departure fuel, route, speed, wind, altitude, vehicle weight, current waypoint, forecasted air/ground traffic congestion, vehicle mechanical variance, vehicle number or vehicle type change.
    EWA—Numerical Weather Prediction models and weather information, including but not limited to:

GFS, simulated future radar depictions, Significant Weather (SigWx), TAFs, NOTAMs, Tropical cyclones, Volcanic ash, Radiation, Tsunami estimates and Space weather.

3. Animation Tools—A human factors method was developed with pilot and Dispatcher feedback, to select and visualize information in the time dimension and to compensate for varied valid times in different data program products. The global default begin and end time span may be set or adjusted manually, but straightforward defaults allow quick animation of user selected layers. The animation speed of individual data program products may also be adjusted or selected as the default global speed to enable effective human viewing. For example, GFS model based winds and model program products span latest 24 hour to 36 hour at 3 hour and 6 hour time step intervals. Radar and lightning span latest one to three hours at 5 minute time step intervals. Global satellite imagery spans latest 3 hour at 20 min time step intervals. Flight plans span anywhere from one hour (approx.) to 10 hour or more, and are animated at 5 or 15 min time step intervals.

4. Measure Tools—Interactive methods are provided for creation of Great Circles on the surface or at altitude, down-range and up-range path distance, and measuring at constant altitude both above and below the surface of a 3-dimensional virtual globe. These measurements are reported in variable user selected units.

5. Program Product Tools—Methods are provided on the target platforms (CIDS and PIDS) for creating derived program products from scratch or by editing existing data objects. These tools are used throughout the coordinated transportation system on any target platform. Such derived program products may be exchanged across the communications system with other platforms and users through the central repository, and are thereby archived at the central repository.

6. Development of the prototype and operational capability—The COE software coordinates automatically with EFB data services, and provides a friendly touch User Interface (UI) for selected viewing and manipulation of aviation weather information in 4 dimensions using geobrowsers. Operating as an "Electronic Flight Bag" (EFB), the EFB software runs on Hawaiian Airlines Dispatch computers (Desktops and Laptops running Microsoft Windows 7 or 8 or 10) and airline (EFB) devices (Tablets running Microsoft Windows 8 and 10). The COE software is provided as a single signed Windows "dotNet" executable with ancillary procedures for automatic software loading and updates. WxOps EFB Version 1.0 is specifically designed to work with airline licensed copies of the Google Earth™ geobrowser.

Figure 4:
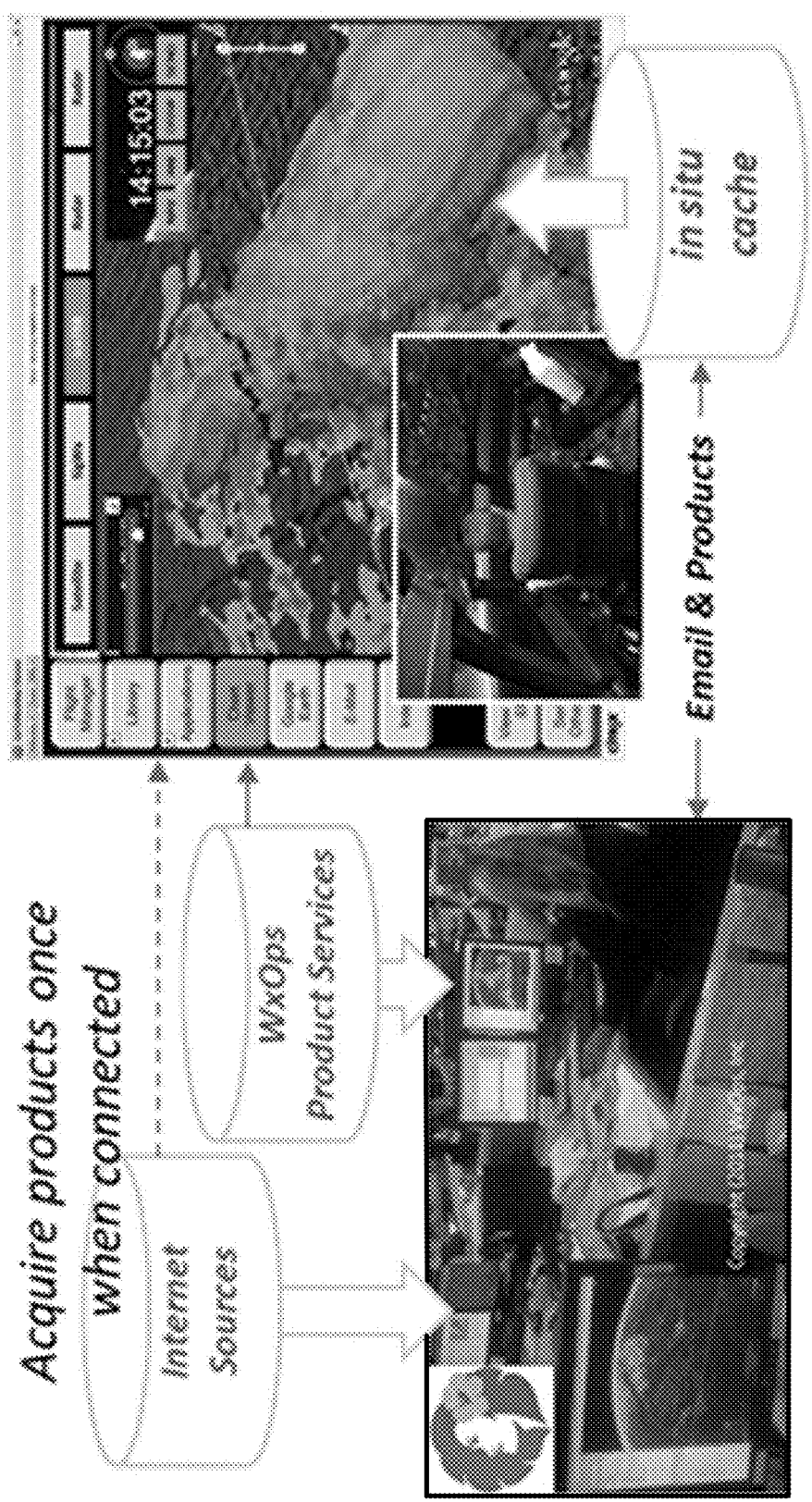
FIG. 4 is a schematic diagram showing the acquisition of weather and logistic information, shown with paths to/from multiple external data sources.

FIG. 4 is a schematic diagram showing the acquisition of weather and logistic information, shown with paths to/from multiple external data sources. Typical sources include data services such as WxOps® Software Product Services. Dispatch Operations have the capability to send any Keyhole Markup Language (KML) layer, for example as an email attachment to EFBs on the ground when connected by ground ISP, or en-route when the EFBs are connected via satellite.

Geobrowser technology supports 3-dimensional animation for any displayed object that can be described by the Keyhole Markup Language (KML) latest version 2.2, an OGC Open Standard. The EFB provides 3-dimensional animation capabilities in the cockpit for any data set or KML program product or layer that may be used or produced on the ground by or for Hawaiian Dispatch Operations. The use of the KML program product or layer is constrained by the bandwidth limitations imposed by ISP or Satellite Communications providers. The geobrowsers' ability to show all data together in its proper 3-dimensional location and time has become known as the Common Operating Environment (COE).

One of the major benefits of the EFB is the efficiency gained by limiting the transmission of data and program products to remote devices. The design goal is to transmit such program products only once. Local cache archives of program products and data allow in-flight operations to continue when the "Internet connection" or communication path is lost. Efficiency is further enhanced by sending data rather than program products, where a smaller set of data can be used to generate multiple large KML program products. Substantial bandwidth savings are realized for the GFS model program products alone, which are reused on the EFB to create derived program products. The GFS grids are updated every 6 hours and provide model forecast coverage out to 36 hours. The GFS model grid KML program products currently provided by EFB data services are about the same size as a compacted grid file for the same data.

The efficiency is gained by using a synchronization module, which exchanges data in an efficient manner by taking advantage of high speed local terrestrial connections, such as WiFi and cellular hot spots, while using low bandwidth connections such as satellite communications for updates when the high speed connections are not available. The synchronization module provides and receives updates of the operational plan, in which the updates provide changed data to the operational plan without replacing substantial portions of the stored data for the operational plan. This allows synchronization of the operational plan with a remotely located control facility and permits a controller or dispatcher function at a vehicle operations controller facility or dispatch controller facility to screen share the in-vehicle display based on information previously stored, as updated by the updates.

All weather services currently in use or planned use at Hawaiian Dispatch Operations are supported, including:
  EFB data services (SigWx Charts and GFS Model Products KML)
  Radar Shapefiles™ (ESRI) as KML
  Satellite Imagery as GroundOverlay KML
  Other online KML sources (any OGC 2.2 KML)
  Weather services based on models are updated every 6 hours, including SigWx Charts, Icing and Turbulence charts, and convective activity program products.
  Important program products which are updated at higher rates include radar and satellite imagery.
  Static information such as the FAA Navigation Charts are updated relatively infrequently and are easily managed by the data acquisition module when EFB's are connected through the ground ISP.
  Unique program products such as KML drawings, screen captures, aircraft positions, and SIGMETS are generated on a non-scheduled basis, and can be transmitted to an aircraft when a communication channel is available.

The EFB software is loaded on both ground Dispatch and airborne systems, allowing for uniformity in operations. Configuration tables have been built into the EFB prototypes, allowing users to change many aspects of the UI without modifications to the software. Configurable items include button colors and text, preloaded animation tables, layer visibility names and KML <href> links, program product regions and classes for limiting data acquisition bandwidth, images for icons used in graphics production, and miscellaneous parameters for program product generation.

Figure 5:
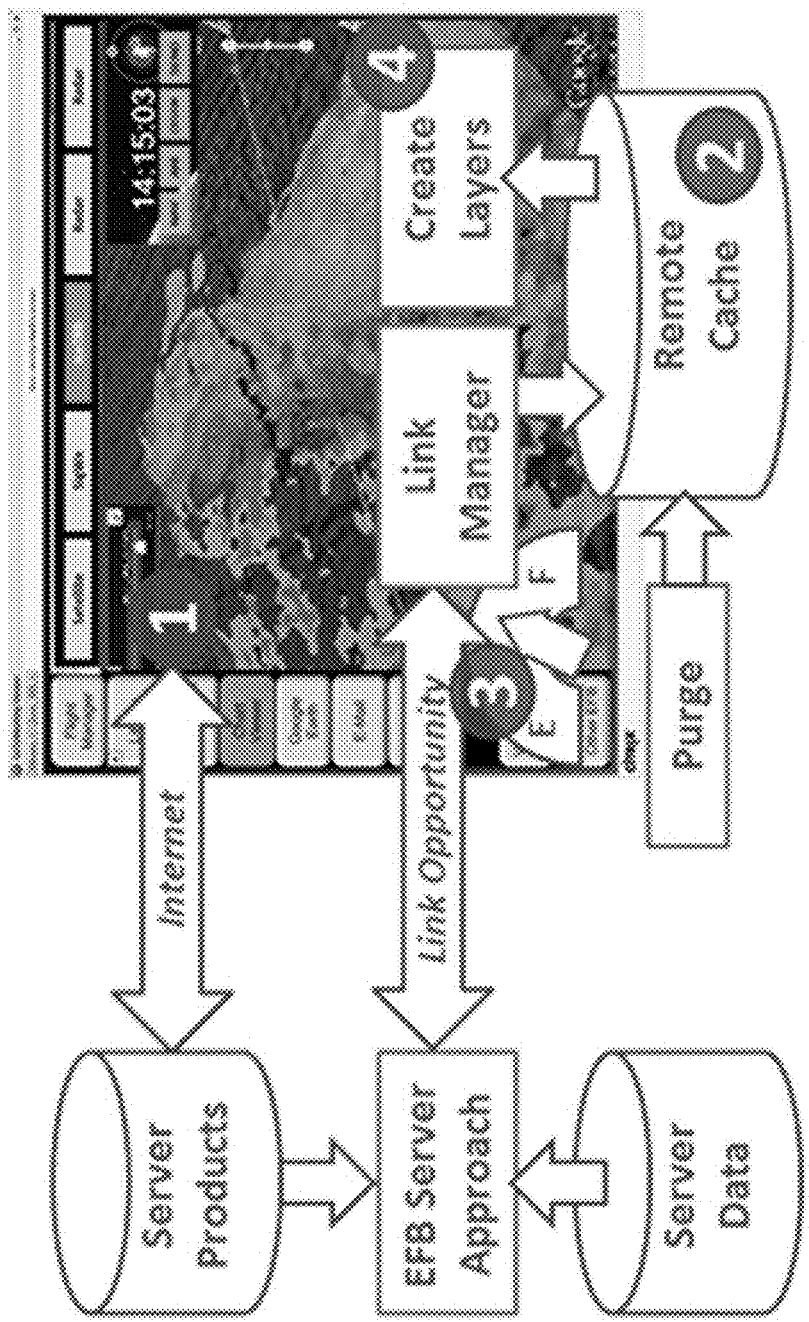
FIG. 5 is a schematic diagram showing a "gopher" architecture used for continued operations under conditions of occasional connectivity.

FIG. 5 is a schematic diagram showing a "gopher" architecture used for continued operations under conditions of occasional connectivity. The system transmit protocol is designed to minimize bandwidth consumption by uploading or downloading data and software program components only once, which provides a local archive. EFB operations can continue from local archives when the EFB is not connected to the Internet. Data products are created on remote platforms where possible to reduce data transmission bandwidth.

The EFB data acquisition strategy is outlined in FIG. 5. Ground based geobrowsers are normally connected to high-bandwidth communication channels and refresh their data frequently (item 1 in FIG. 5). This is current practice for Dispatch Operations. Such connectivity would result in excessive bandwidth consumption for on-board systems, however, especially for high demand satellite image and radar services which update frequently and at high spatial resolution. Since remote EFB systems can operate reliably using data from "local cache" (item 2 in FIG. 5), remote operations can continue without interruption when the communication channel is lost or interrupted. The EFB is therefore built to test the ISP connection every minute (a configurable item), determine if new program products are available, and download them when a communication path is stable (item 3 in FIG. 5). Once on board, new derived program products are created as needed (item 4 in FIG. 5).

Figure 6:
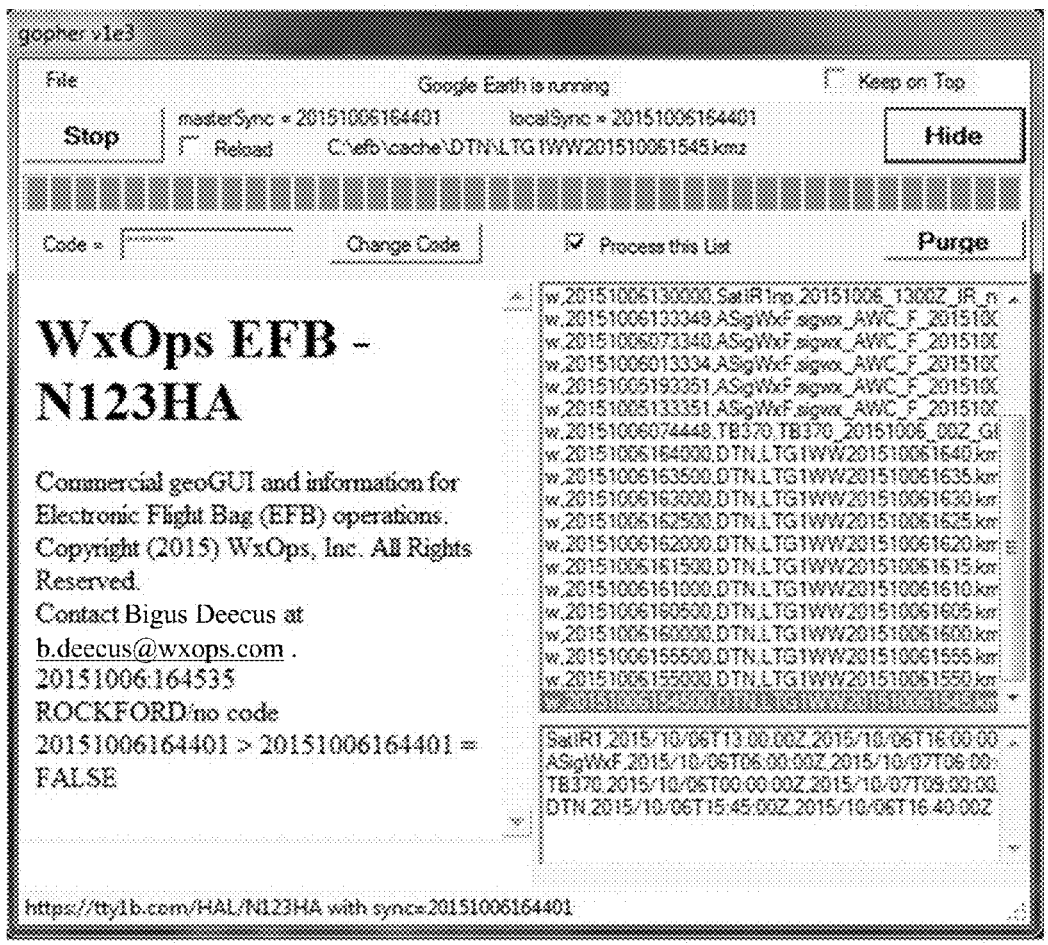
FIG. 6 is a schematic diagram showing the "gopher" panel.

FIG. 6 is a schematic diagram showing the "gopher" panel. The system "gopher" communicates with a data portal, such as the WxOps® Data Portal and transfers data files once to local cache. Gopher will rescan the manifest any time the mastersync changes on the data program product server. The gopher for data acquisition is able to function over an unreliable communication interface, with limited bandwidth. Internet connection to an EFB Tablet is made through a ground ISP when an aircraft is in range of a compatible terminal ISP. Limited internet connectivity while en route is provided through satellite communication.

Also known in the early prototypes as "gopher", the Data Acquisition Module automatically connects to EFB data services when online connectivity is detected. Once connected, EFB data are downloaded to the local archive in the background. The latest version of each program product is downloaded first in the event that connectivity is lost, which priority can be set by parameters in the EFB's config.ini. The local archive program products remain in local cache when/if the internet connection is lost. Detection of KML received from external sources including email to any EFB is supported:

Connection Status
Data Acquisition Management
Bandwidth Metering
Communications with Airline Servers
The "Governor"

Connection status providing an indication of connection state is accessed with the "Pualani" Logo (this logo is a Trademark of Hawaiian Airlines). This image logo is shown in full color when the EFB is connected, and may be shown in black & white when not connected. A working "gopher" panel is shown in FIG. 6. This data acquisition strategy is a key design point for supporting continuous EFB operations en route under conditions of unreliable internet connectivity. Although internet connectivity may become reliable in the future, the internet cannot be guaranteed to be "always ON" over vast areas of the Pacific.

Data Acquisition Management controls the behavior and status of the "gopher" function and are controlled by password protected access through the Settings panel in the secondary UI. Administrative functions are available to repair operations should any of the component functions fail. Additional functions are available under the secondary UI, including Cache purge and Screen Capture. Automatic Cache Purge can be set by config.ini parameter.

Figure 7:
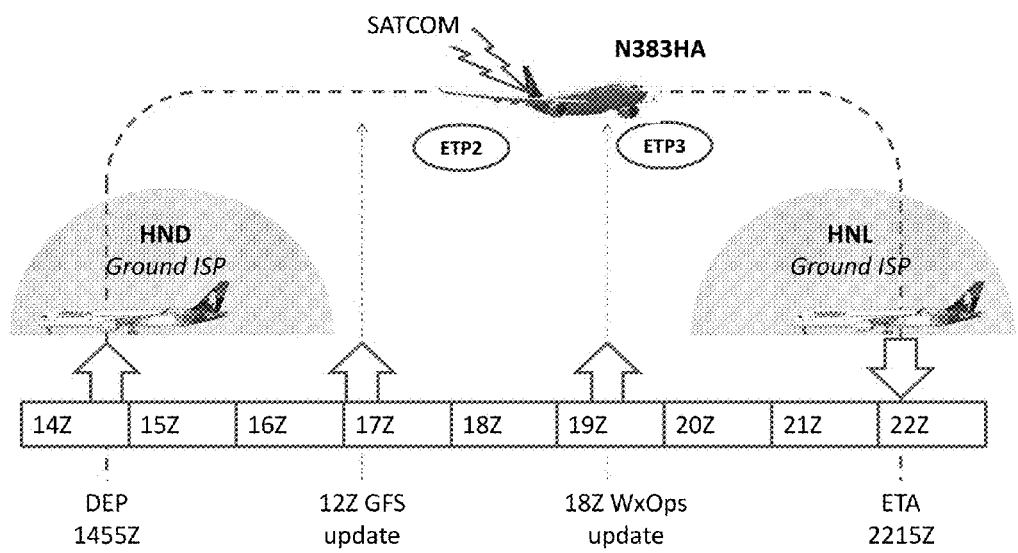
FIG. 7 is a schematic diagram of a conceptual view of program component transmission to aircraft on a typical flight plan.

FIG. 7 is a schematic diagram of a conceptual view of program component transmission to aircraft on a typical flight plan (the example depicted being Hawaiian Aircraft on a Tokyo to Honolulu flight). The onboard EFBs are refreshed by ground ISP until physical departure or aircraft out of ground ISP range. As shown in this example flight plan, the GFS model and model-derived program components are updated once during flight, but such updates would not have been available when the flight plan was created. "Real time" program components such as satellite imagery and/or lightning would require transmission to the aircraft en route.

In bandwidth metering, the "gopher" approach allows for metering and control of data program products transmitted over communication paths. As shown in FIG. 7, the remote EFBs are refreshed on the ground when connected to secure Hawaiian ground ISP, which are provided at or near air terminals. The updated data program products are held on each EFB in local storage until purged. Once out of ground ISP range, only selected program products are acquired via satellite communications, and with program product selection under the direct control of Flight Operations. Program products that refresh every 6 hours (e.g., SigWx, model grids, model icing & turbulence, etc.) are sufficiently current so that refresh during flight is not required. Program products that refresh more frequently (e.g., SIGMET, Aircraft Positions, satellite imagery, radar, lightning, etc.) will require transmission during flight, if selected under the direct control of Flight Operations.

Communications with airline servers is achieved. The airline flight planning SOAP client may be operating system agnostic, and can be made to work in a convenient commercial environment. In one non-limiting example, the SOAP client may be made to work in the Windows Desktop environment. The available data fields and calls acceptable to the flight planning engine reside in an MS-SQL database locally on the airline network. The database and SOAP Client allow for bi-directional single and batch requests/responses between the Flight Monitor Tool (FMT), Flight Cartography Tool (FCT), Flight Parameter Tool (FPT), Load Manager (LM) and the AeroData Client (TAC). All requests and responses are stored in the SQL database for diagnostic and historical retrieval purposes. Line plotting information to/from the (FCT) Google Earth™ interface are sent via soap or web services in text or XML form to the airline's servers and database.

The "Governor"—In the testing of the initial first of type, it became clear that there was a need for a module that would report the state of the system. A prototype called, "The Governor" was designed and tested. This utility runs automatically on the EFB, and provides the state of the system to other programs through the Windows Registry.

Figure 8:
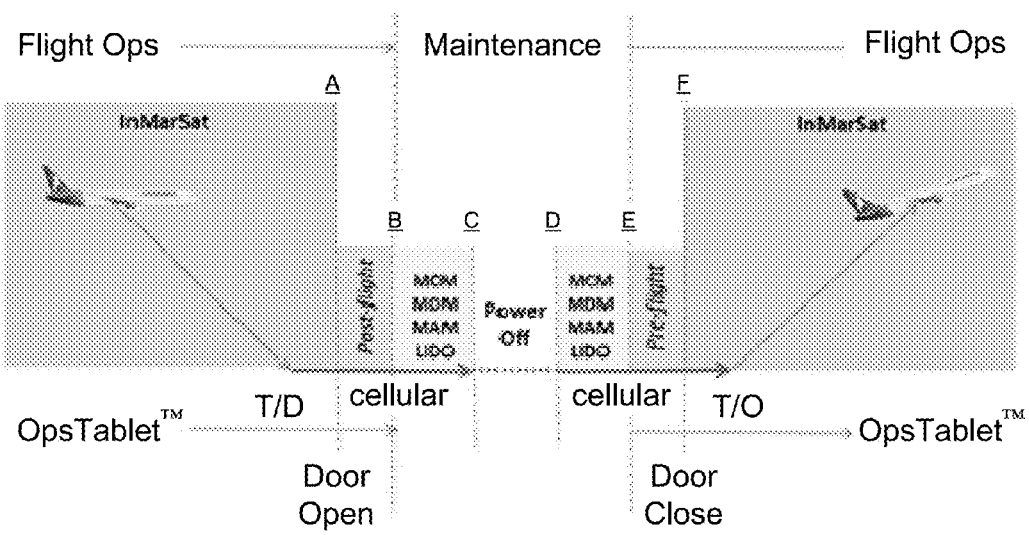
FIG. 8 is a state diagram showing communication modes and applications running during the life cycle of normal aircraft operations.

FIG. 8 is a state diagram showing communication modes and applications running during the life cycle of normal aircraft operations. The "state diagram" for EFB data service operations shows when applications should be run during normal aircraft operations. The states of operation change at six points in time, labeled A through F, as follows:

A Comms switch from InMarSat to cellular. This is usually associated with Weight On Wheels (WOW) and Cabin Door Open. The EFB continues to operate.

B Pilots are done with any post-flight activities involving the EFB. It is expected that pilots will indicate that they are done and are no longer assuming responsibility for flight operations. This could take the form of a logoff. Cellular continues to operate. System enters Maintenance Mode, and the update operations (MCM, MDM, MAM, LIDO) can proceed. Updates should not occur until the pilots sign off. Pilots may be required to record information related to an incident during the flight, and the flight systems must be left in their flight state until released for updating.

C Updates are complete and/or the power to the aircraft is turned off.

D Power to the aircraft is turned on. Updates may proceed until pilots arrive and sign on.

E Pilots sign on and pre-flight operations begin. The EFB is running.

F Comms switch from cellular to InMarSat. This is usually associated with Weight On Wheels (WOW) and Cabin Door Closed. The EFB continues to operate.

The Governor acquires state information from the Flight Deck by connections through the UTAS AID. In this manner, data are acquired from flight instrumentation and interfaces including ARINC 429, ARINC 834, and ARINC 708. The data acquired include but are not limited to aircraft position (lon, lat, alt) and orientation (bearing, pitch, roll, yaw), true and ground air speed, and environmental variables, e.g., outside air temperature (OAT) and humidity (if available).

Figure 9:
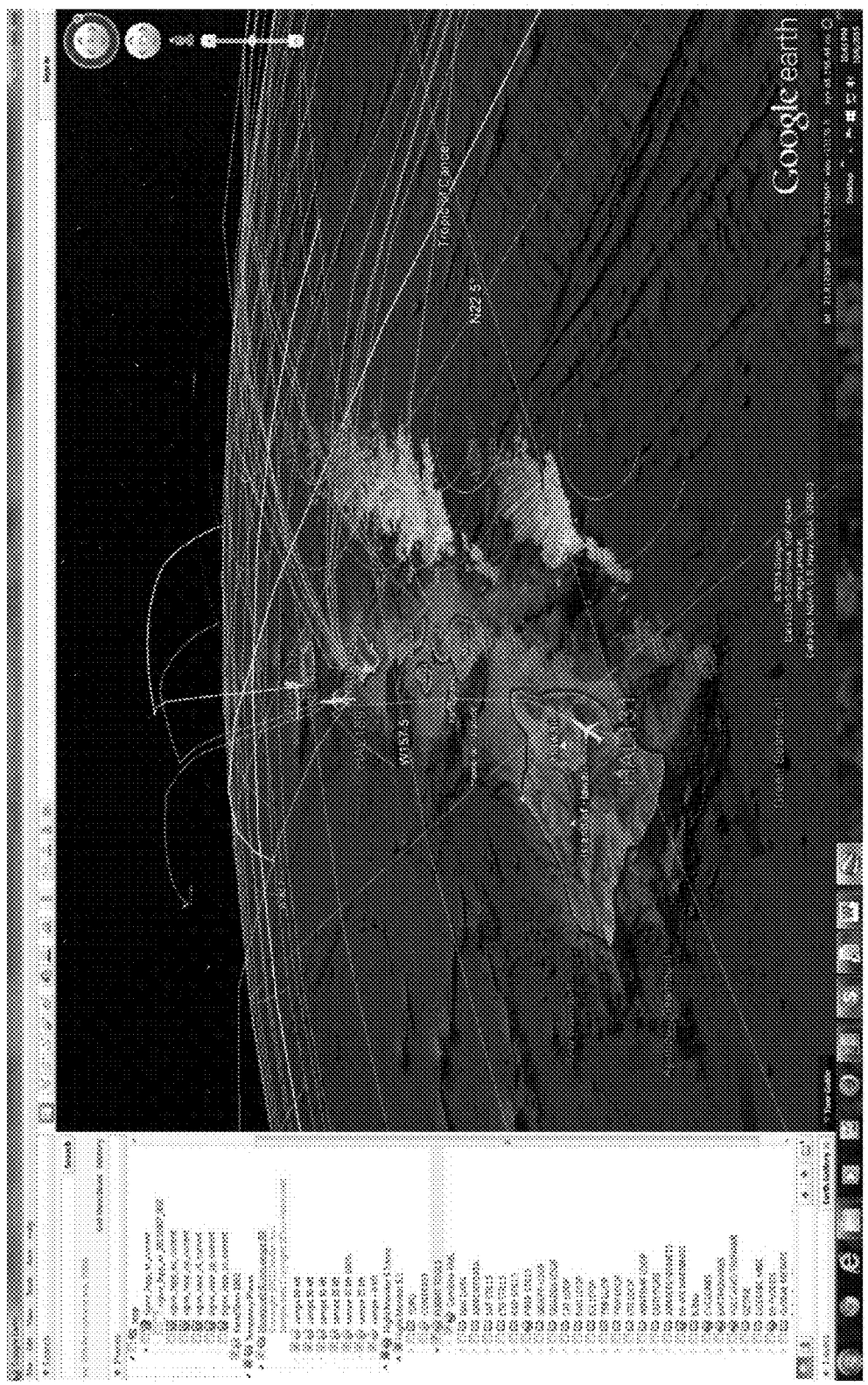
FIG. 9 is a depiction of a cockpit interface, inclusion in on-board COE, and transmission to ground server for inclusion in mosaic program products.

FIG. 9 is a depiction of a cockpit ARINC 708 interface on board a B767, inclusion in on-board COE, and transmission to ground server for inclusion in mosaic program products. On the left side of the interface is a directory of files. (The particular filenames in the directory shown in the sample are not part of the present disclosure, and are therefore not depicted separately.) In this manner, airborne radar observations from multiple aircraft are merged by ground processing and the composite is rebroadcast to the fleet. The ARINC 708 interface is provided by a Honeywell® RDR 4000, although other interfaces can be used.

The collection and collocated/simultaneous display of radar information from the ARINC 708 interface, is specifically addressed as shown in FIG. 9. When collected, the 3D ARINC 708 interface reflectivity can be overlaid on the Common Operating Environment (COE) in the cockpit. We also transmit this radar information (along with the flight deck info) to the Server, where it is provided to Hawaiian for integration into the ground operations. The composite radar returns from multiple aircraft provides a unique enhancement to existing 4DKMZ for the ground based radars, currently limited to Hawaii, Guam, CONUS, and other data available through Schneider Electric for Australia and Japan. This allows the radar returns to be treated as a kind of "radar PIREP", in which the radar returns from aircraft are used to enhance weather observations. It is also contemplated that radar composites may be produced on the ground, for retransmission to aircraft in flight. By way of non-limiting examples, such radar composites may be transmitted to aircraft in flight in a manner similar to NEXRAD transmissions, or as more elaborate 3-D displays.

Table 1 depicts a set of major program segments used in an airline Electronic Flight Bag (EFB) application using the disclosed techniques. The particular implementation renders the WxOps OpsTablet® EFB and User Interface (UI) for geobrowser applications. The program provides seven software items, as follows:

TABLE 1

OpsTablet ® Software Items and Status

| Software Item | Description | v1e2 Test Procedure |
|---|---|---|
| SI-1 | User Interface (UI), OpsTablet Primary & Secondary UI, and Navigation | Section 5 & 6 |
| SI-2 | Animation Widget | Section 8 |
| SI-3 | Visibility Controls | Section 7 |
| SI-4 | Data Acquisition | Section 9 |
| SI-5 | Drawing & Screen Capture | Section 5 & 10 |
| SI-6 | KML Production | Section 11 & 12 |
| SI-7 | Software Load/Update | Section 3, 4 |

Figure 10A:
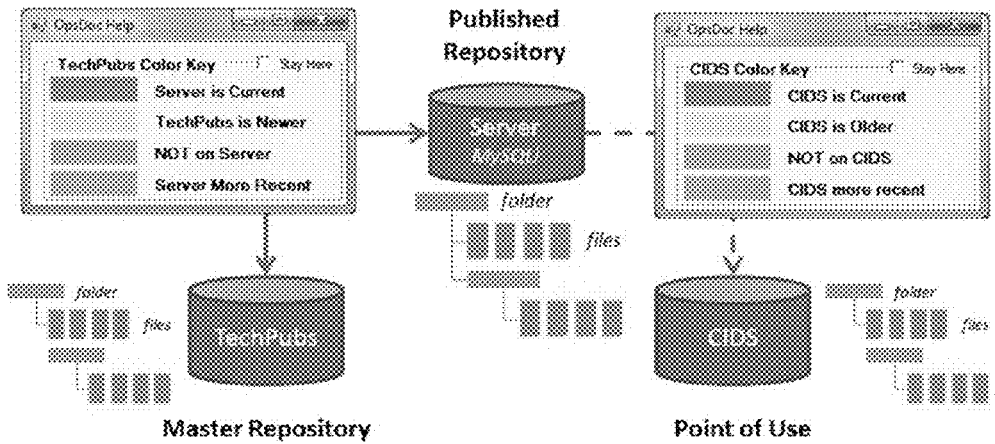
FIGS. 10A-C are schematic diagrams of an EFB basic publishing concept.
Figure 10B:
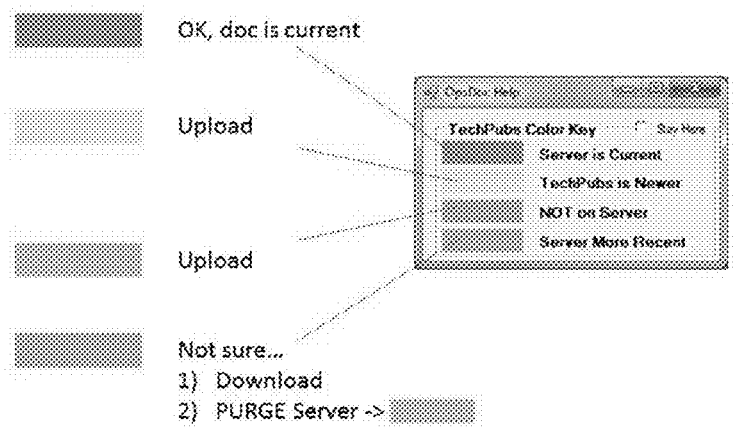
Figure 10C:
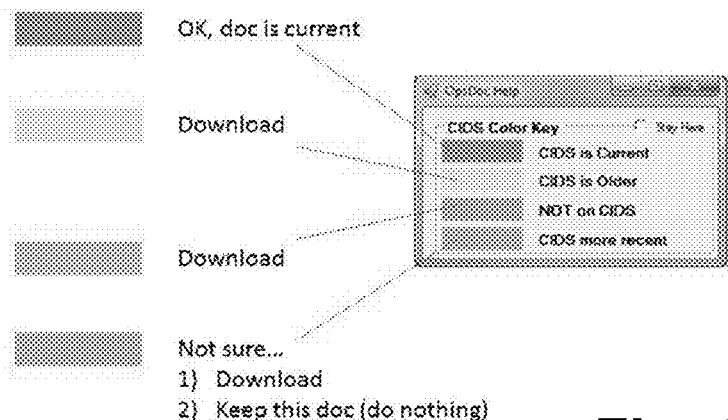

FIGS. 10A-C are schematic diagrams of an EFB basic publishing concept. FIG. 10A shows a "publishing" linkage. A master repository, which provides a configuration control function, depicted as "TechPubs", maintains published documents on a server. The point of use is a Cockpit Interactive Device (CID) tablet for flight operations. A web UI is used for display of document status on each tablet, and color coding is used to quickly identify problem areas related to transmission of documents.

FIG. 10B shows a TechPubs display used at a dispatcher station. FIG. 10C shows a CID view. The TechPubs and CID displays are generally viewed separately, so that the operator of either only is able to see update discrepancies by looking at the particular device. As depicted in FIGS. 10B and 10C, TechPubs and CID are generally viewed separately, so that the operator of either only is able to see update discrepancies by looking at the particular device.

The transfer of data uses a "publishing" concept, where TechPubs must take an action to update the repository on the server. Once documents are changed on the server, these changes become visible to all CIDS. CIDS cannot change Server contents, but functions are provided for CIDS to manage its local repository.

Color coding is used to quickly identify problem areas related to transmission of documents. The color coding uses four color codes which are, from top to bottom, green, yellow, red, and blue, and which indicate status. Status color "green" indicates that tablet and ground server are in "sync" and documents (files) are up to date. This is represented as "server is current" or "CIDS is current". Since documents are typically transmitted to CID when the aircraft is at the gate, if the aircraft is enroute, it may take up to twelve hours for published documents to get updated and receipts received. Pending status color "yellow" is used to indicate that the document has just been published, and time since publication is shown in hours (e.g., 0 to 23 hours). This is represented as "TechPubs is newer" or "CIDS is older", as publication is generally from TechPubs to CID. Warning status color "red" indicates that a document receipt has not been received within the past 24 hours. A "blue" indicator corresponds to "Server is more recent" or "CID is more recent".

The EFB maintains a document management capability. The EFB communications capability is well matched to supporting the management and tracking of documents required to be onboard aircraft prior to and during flight.

Geobrowser-based software and data is reconfigured into the EFB for coordinated Pilot—Dispatch Operations at the airline. Similarly, existing EFB software and methods are reconfigured to meet airline requirements for Mobile Content Management (MCM) of the aircraft libraries. A web-based portal (UI) is provided which will be used by airline personnel to monitor and maintain PDF documents on each EFB. The Document Services Portal (UI) shows the document version state on each EFB, which is typically configured for at least one airframe type (B767, A330, etc.). Airline personnel upload new and revised documents to the portal (UI), and identify which EFB's or EFB groups/classes are to receive the documents. A status panel then shows the progress of document transfer and acknowledgement on a per EFB basis. The most basic UI for document status on one tablet is shown for a CID in FIGS. 10A-C.

Figure 11A:
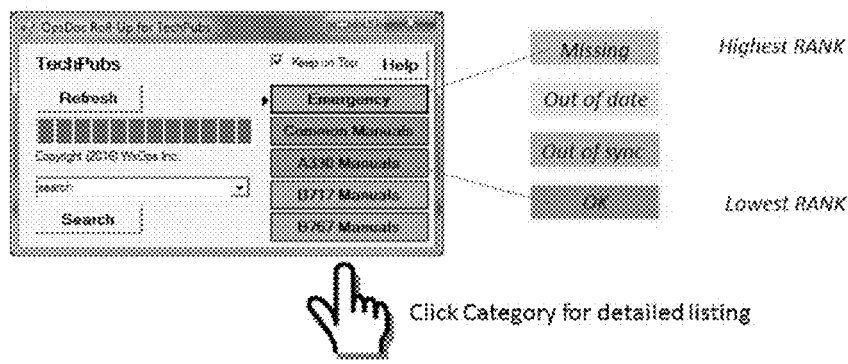
FIGS. 11A-11C are depictions of TechPubs and CIDS "roll-ups", or scrolled lists providing a uniform color coded status by document category.
Figure 11B:
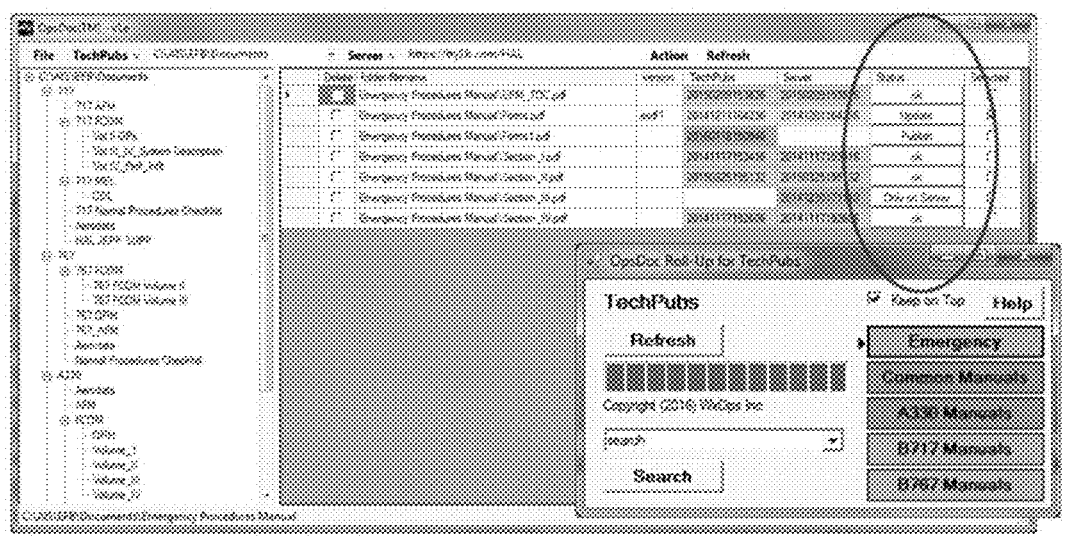
Figure 11C:
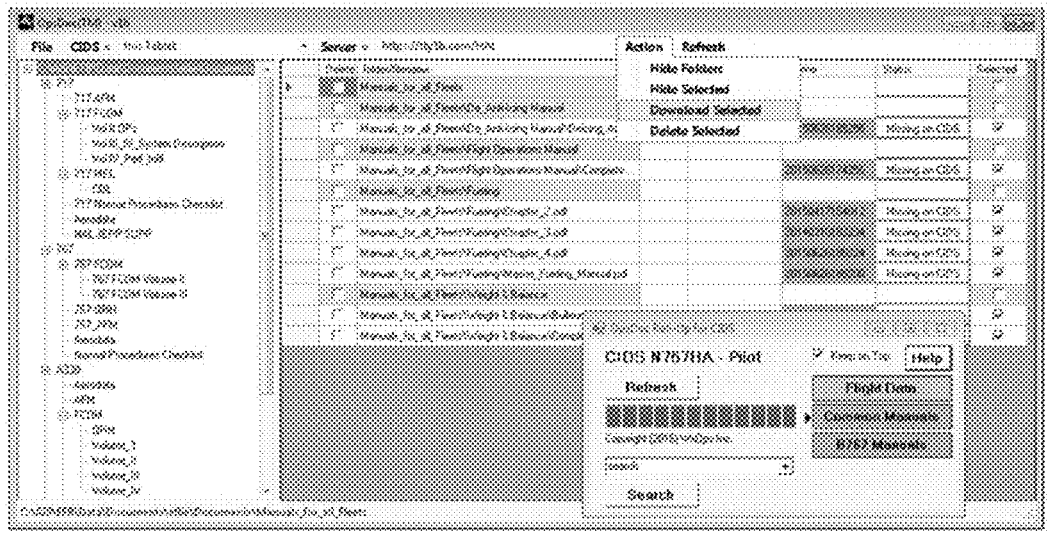

FIGS. 11A-11C are depictions of TechPubs and CIDS "roll-ups". The "roll-ups" are scrolled lists which provide a uniform color coded status by document category. Roll-ups show highest ranking status of documents in a category and a detailed listing of documents within a category. Status column allows action to be taken. Detailed listing of documents within a category. Status column allows action to be taken, which is shown in FIG. 11B. CID document actions in detailed listing. CID Actions are limited to download from server, and deletion of documents from local storage as shown in FIG. 11C. Only TechPubs can publish or purge documents to/from the server.

FIG. 11B depicts a detailed listing for TechPubs, looking at the "Emergency" category. Two columns are provided following the color code, which show the state of documents on TechPubs at the local repository or TechPubs master and on the server. The actions consistent with the state of documents between TechPubs and server are provided as buttons in a third column. Clicking on an action automatically updates the documents and MySQL database, and changes the colors to match the updated document state. Pull down menus are described as "Action", and provide additional functions which will perform actions on all documents in a category or folder, as appropriate.

FIG. 11C depicts CID document actions in a detailed listing for CIDS, looking at the "Common Manuals" category. CID actions are limited to download from server, and delete documents from local storage. Two columns are provided following the color code, which show the state of documents on CIDS at a local repository, and on the server. The actions consistent with the state of documents between CIDS and server are provided as buttons in a third column. Clicking on an action will automatically update the documents in the local CIDS repository, and change the colors to match the updated document state. Pull down menus are described as "Action", and provide additional functions which will perform actions on all documents in a category/folder, as appropriate.

Figure 12:
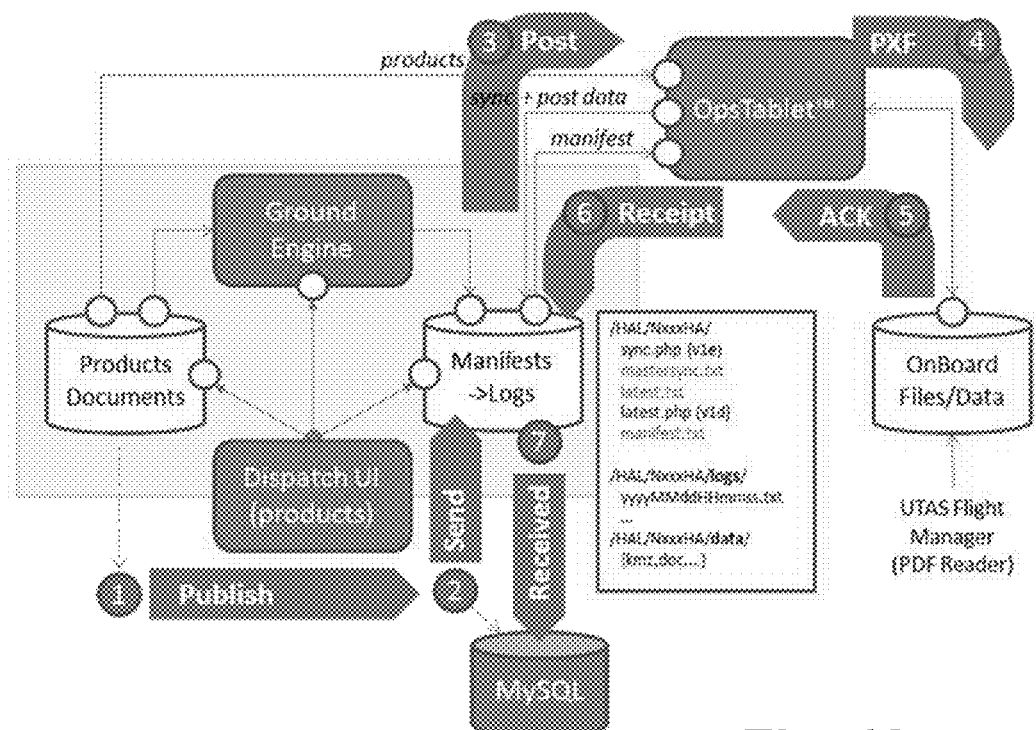
FIG. 12 is a schematic diagram of an EFB publishing protocol a using sync capability of "gopher" module.

FIG. 12 is a schematic diagram of an EFB publishing protocol a using sync capability of "gopher" module. The "gopher" module is a file transfer and update module which uses program product and document manifests under password protected directories on the airline's server. The "gopher" module securely transfers weather program components, ad hoc files, and documents to mobile tablets. Tablet information used as the CID is transmitted to the server using an encrypted sync and post data request, supporting relays of tablet state, content, location, and document receipts.

The COE transfers weather data files using https (SSL) protocols according to a manifest managed by airline dispatch personnel. This file transfer approach (aka "gopher") is outlined in FIG. 12. The EFB gopher is adapted to transfer documents using a similar manifest managed by airline technical publications personnel. The EFB software will be updated to accommodate the additional Document Management functions. The requirement for document receipts is already supported by the "Sync" as post data in the EFB.

EFB document services extends the existing WxOps OpsTable® data transfer capability (aka "gopher") to include PDF documents, which are uploaded as needed to each EFB when connected by selected "Wi-Fi" channels to the AID server. This approach avoids the data transfer expense of document transfer using the airline-InmarSat communication channel, which is blocked for document transfers. The existing "program product manifest" folders on the server are used to inform each EFB when new documents are available. The existing COE program product receipt feature is used to acknowledge successful document transfer and update the document distribution state of each EFB on the server.

IT Security Concerns

The EFB is designed to work in a "dirty" environment. The operations concept can incorporate features of the inventors' earlier original EFB design, described in U.S. Pat. No. 5,265,024, in which the primary hazard to operations was the existence of the communication path. The EFB industry markets the myth that the internet is "always on", allowing for Cloud applications where processing and data are served from a central source. In contrast, the EFB ensures continued operations with the data on hand when the communications path is disrupted. When connected, the EFB strives to reduce operating costs by transmitting data/program products only once. Bandwidth costs will become a major factor in sustained EFB operations. Many cloud applications assume unlimited low-cost bandwidth, and hidden processes consume bandwidth when allowed to "phone home" to target servers. The UTAS AID helps us here by limiting traffic to selected IP on a "WhiteList".

A current threat of attacks is by agents seeking to obtain information or cause harm by gaining control of aircraft systems or disseminating false information. The EFB embraces SSL and Fully Qualified Domain Names (FQDN) with Certificate Authority (CA) to thwart interference, but exploits have been discovered in most of the security protocols. Therefore, the EFB design has allowed that it may not be connected to a reliable source. In addition, the server has allowed that requests may not be coming from bona fide users, so additional security measures have been built in.

The current UTAS AID (FAA Approved) limits connections to IP addresses. Effective 1 Nov. 2015, the IETF CA/Browser Forum is deprecating the issuance of certificates with non-FQDNs (see http://www.entrust.com/ssl-certificates-without-non-fqdns/). This will affect the EFB's ability to identify and establish trust with the Server. The absence of a CA does not affect our ability to encrypt the exchange once the connection and level of trust have been established. The problem is knowing who we are talking to.

An EFB CID normally connects to the Server with identification information including the aircraft tail number in the format "NxxxHA". There is an exchange of local sync and multiple passkey information from the CID as postdata, which allows the server to decide whether the CID query is genuine. Some of this passkey information is configurable (defined in the EFB config file), and another part is private (defined in the EFB code). The details of the passkeys and methods are not disclosed here. The primary function of the program product server is to provide an updated listing of the "program product manifest", which identifies latest program products available for downloading. This program product list is tailored to each aircraft, as defined by Dispatch Operations. This "program product manifest" lists the filenames but not the paths for each program product file, along with version (sync) information. Each EFB privately knows where to look for each program product, based upon a program product ID defined in the EFB config file (the "PXF" entries). If the program product list (aka manifest) is considered to be a sensitive document, then it will be encrypted prior to transmission. Ad hoc files (e.g., KML/KMZ and PDF documents) are handled in the same way. If any of the ad hoc files contain sensitive information, then they will be encrypted before being placed on the server, either using ZIP ENCRYPT (already supported in the EFB) or PGP (open source).

Information coming from the EFB CID to the Server is encrypted on the EFB and presented to the server as an encrypted ad hoc file. The encrypted ad hoc file is secured a second time for transmission to the server as postdata under SSL. Using this approach, any Man In The Middle (MITM) attack will be presented with encrypted files that will be difficult to understand.

Another MITM threat is the extraction of the credentials (username/password) required to access the server sync folder. This folder is writeable only by selected users who are also accessing the folder from a few selected IP's. Any attempt to obtain a directory listing in these folders has been anticipated and suppressed. The applications which may reside in these folders are mostly read operations. However, if attackers perform write operations, then we have embedded additional pass key protections.

From the above, it can be seen that the CA is used primarily to identify the server and determine a level of trust. This connection process is not foolproof even with an FQDN, as various published exploits show. Therefore, we should assume that MITM attacks are possible even with FQDN, and defend our data using the encryption techniques described above. Once the SSL connection has been established, then the exchange of information proceeds with data encryption that is understandable to the participants. If one of these participants is an MITM, then we present them with encrypted content.

Given the measures taken and described above, MITM attacks can be detected and that sensitive data can be exchanged securely in the presence of MITM attacks. Once detected, the program product server would record any details available and provide a notification by text message and email of the attack. If the MITM persists in blocking EFB access to the server, then a prompt notification would allow personnel to execute a TraceT to gain additional information on the attacker. In the case of a blocked the EFB, we must distinguish between a dropped call and a program product server impersonation. Information on an attack detected by a CID would be provided upon the next successful contact with the Server. An alternate program product server would be useful in such situations, and would serve as a backup for normal operations.

Starting the EFB Application.

Figure 13:
FIG. 13 is a representation of the CID's UI overlaid and connected to a geobrowser providing virtual globe, map and geographical information.

FIG. 13 is a representation of the CID's UI overlaid and connected to Google Earth™ Pro, which is a geobrowser providing virtual globe, map and geographical information. Depicted are roll-up window 1311 depicting currency of data, communication and time menu 1313, display layers activation menu 1315 and navigation menu 1317. Roll-up window 1311 shows the status of the required data and operating manuals. Communication and time menu 1313 has icon window 1323, which shows the current time in UTC, an indication that data required for the PID is loaded, and is connected to WiFi. Communication and time menu 1313 also includes communication menu selections 1325. Display layers activation menu 1315 has animation control menu 1333 and layer selection menu 1335.

Figure 14:
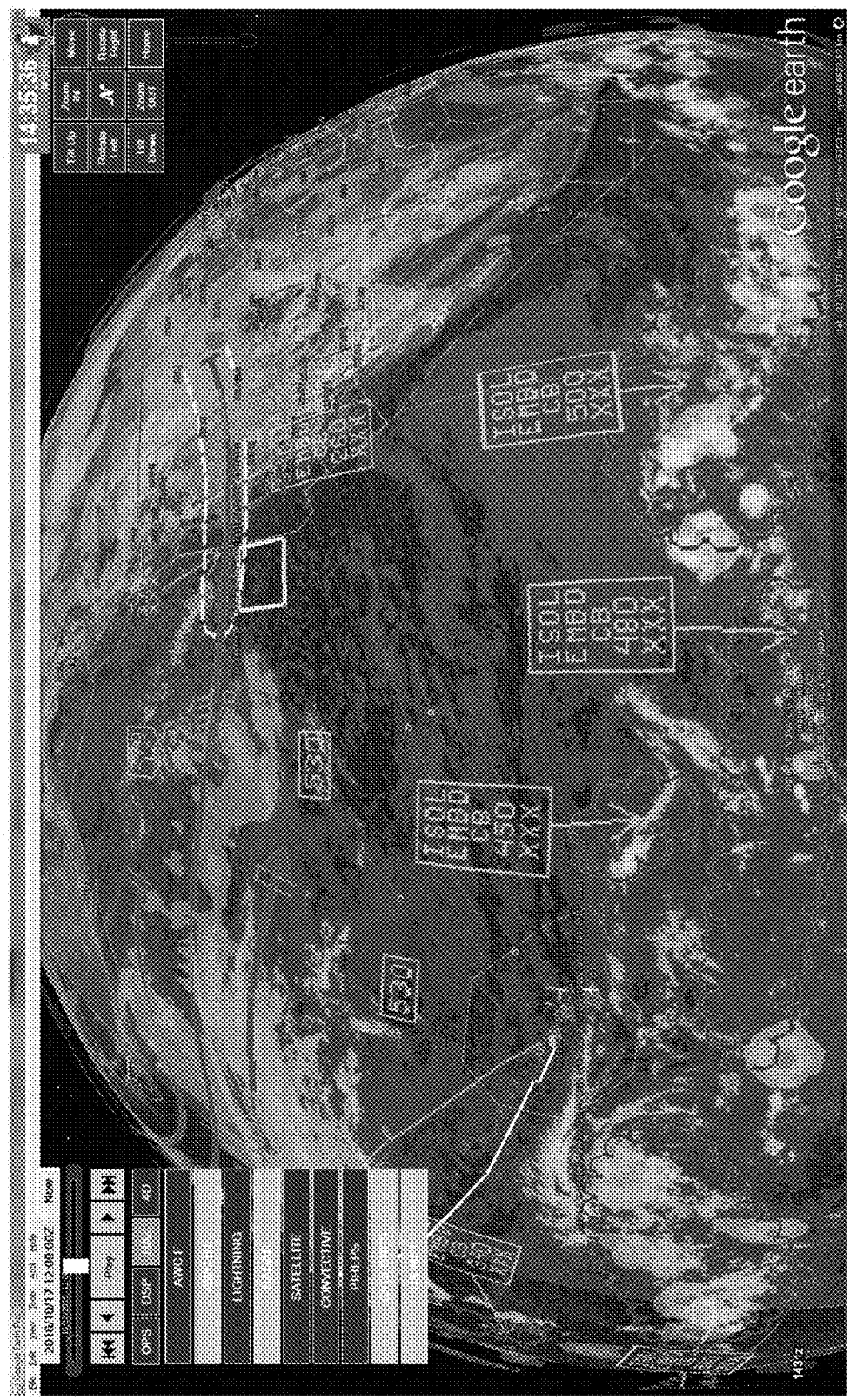
FIG. 14 is a representation of the CID's UI in a state ready for satellite image animation.

FIG. 14 is a representation of the CID's UI in a state ready for satellite image animation. Starting from state shown in FIG. 13, the operator would select the SAT button, and a green rectangle will appear showing the animation parameters. This green rectangle collapses to indicate which layer is selected for animation. A rewind button sets a time slider to the beginning of the satellite loop. A play selection is used to start animation, and pause stops the animation.

The "Pualani" icon (Hawaiian Airlines logo, icon 13 of 14 "tray" icons on the bottom of the screen) can be used to manage the CID functions. The "Pualani" icon is selected to open a primary UI or a secondary UI. Additional UI are provided for GEO navigation and control (NAV), layer visibility selection (Layers), and animation (ANI).

Figure 15:
FIG. 15 is a representation of the CID's UI configured to allow GEO navigation and control (NAV), layer visibility selection (Layers), and animation (ANI).

FIG. 15 is a representation of the CID's UI. The UI menu functions are configured to allow GEO navigation and control (NAV), layer visibility selection (Layers), and animation (AND.

In order to initiate the EFB, the user engages the Startup and Hook settings to bring up the entire system (the EFB and Google Earth™) to the initial state shown in FIG. 14. The application may take some time to download data, and will show the EFB UI after the current data files are acquired. To set animation on satellite images, the user engages (clicks on or touches) the SAT button (animation details will appear), then engages (clicks on or touches) the rewind button. This will result in the state shown in FIG. 15. The user engages (clicks on or touches) play to watch satellite image animation. To exit, the user engages (clicks on or touches) the "Pualani" logo and the "Aloha" button.

The EFB User Interface

The EFB User Interface (UI) provides a touch friendly layer over geobrowsers (GEO) such as Google Earth™ (GE). This UI has been developed and refined since its initial appearance in a NASA SBIR (2008) as the WxAzygy® transparent interface. The EFB provides a set of controls that demonstrates all required EFB functions. The following steps are intended to introduce you to the functions of the EFB UI.

For general familiarization, the user will see the following UI components overlaying the geobrowser. The Primary UI includes the clock (UTC) and the Hawaiian Airlines "Pualani" icon with additional information. All functions can be accessed through the "Pualani" icon by touch (mouse left click) or press and hold (mouse right click).

Test Procedure

1 WiFi connection is automatically detected. Manually turn WiFi connection ON/OFF and verify that WiFi state is determined.
2 With config line Using_WiFi=true, then WiFi ON/OFF is enabled and WiFi can be turned ON/OFF programmatically.
3 Show Adapters provides information on all network connections for the current system.
4 In absence of AID, INMARSAT/WIFI radiobuttons can be used to toggle connection state.
5 With AID connected, checkbox "check for AID" reflects correct connection state.
6 Current communication state (Inmarsat, WiFi, nothing) is reflected in "Pualani" icon.

7 Data transfer volume is recorded in the appropriate channel when connected.
8 Gopher Start/Stop controls mastersync queries to the server.
9 When a new mastersync is detected, the program product manifest is acquired and new program products are downloaded to C:\efb\cache.

TEST Procedure for the EFB
1 Run OpsTablet from the desktop icon with gopher_Startup=true, GEO_Startup=true, and GEO_Hook=true. The OpsTablet™ "Pualani" UI will appear over GEO.
2 Engage the "Pualani" icon to toggle the Primary UI (depicted in FIGS. 13 15).
3 Engage the "Pualani" icon to toggle the Secondary UI.
4 Toggle the entire UI using the Hide button, or click and drag the Pualani icon off screen.
5 To unhide OpsTablet™ and maximize GEO, toggle the entire UI using the Show button, or click and drag the Pualani icon off screen.
6 Engage the GEO button to move "Pualani" UI to default location specified in config.ini.
7 Engage the and move "Pualani" UI to relocate "Pualani" UI.
8 Engage the GEO button to stop GEO process. GEO button will return to default color and additional functions (Draw and ad hoc) will disappear.
9 Engage the GEO button to restart GEO process.

Navigation Controls

The Navigation (NAV) Panel is available whenever OpsTablet is connected to a GEO. This widget provides the ability to control the Point of View (POV) of a geobrowser using a single finger or mouse. GEO Pan is achieved by touch on the GEO Render Window, and is a native function of the geobrowser. GEO Zoom is also achieved by touch on the GEO Render Window by pressing until the "circle" appears, then moving your finger up to zoom out, and down to zoom in.

1 Click (touch) and drag the "Move" Button to move the NAV Panel anywhere on the screen. If this Button is touched but not moved, the NAV Panel will collapse to a single button.
2 NORTH (N)—This button will reorient GEO so that North is up, but leaves center position {lon,lat} and tilt unchanged.
3 Zoom IN—Touch this button to Zoom In. Click and Hold to Zoom In with higher precision.
4 HOME—Returns GEO to a specific location and POV, as defined in config.ini (default is Hawaii centric).
5 Zoom OUT—Touch this button to Zoom Out. Click and Hold to Zoom Out with higher precision.
6 Tilt/Rotate—This Button executes a SHIFT Key, which invokes the geobrowser's native tilt/rotate functions if the GEO Render Window is touched within 3 seconds. This is the same GEO function as holding down the ctrl key while touching the screen. Alternately, Tilt/Rotate will change the POV in fixed steps (degrees) for each button click.

Data Layer Selection Controls

The Data Layers Panel reflects the contents of the geobrowser Sidebar, and provides the ability for the user to change the visibility of these layers. The OpsTablet® provides data layer timespan information to the animation widget with a single right click (touch hold). Once TimeSpan information has been transferred, the layer that controls animation is marked with a green button. This ANI button can be clicked to view the current animation parameters.

The selection is performed as follows:
1 Click (touch) and drag the "Portal" OR "Places" buttons to move the LAYERS Panel anywhere on the screen. (If these buttons are touched but not moved, the LAYERS Panel will collapse/expand.
2 Click (touch) "Places" button to refresh the top layers. This function reads the highest level of KML layers listed in "Temporary Places"
3 Click (touch) "Portal" button to refresh the animated layers. This function reads the layers in file "wxops_portal.kml". This function reads the layers identified in the animation list.
4 Click (touch) a layer to change that layer's visibility (ON/OFF). Visibility is indicated by the background color as defined in config.ini (default light gray is OFF)
5 Right click a Portal Layer to extract that layer's TimeSpan information. The TimeSpan information will appear in a green button to the right of the Portal Layer, and this green button will collapse to a smaller marker (ANI) after 4 seconds. This TimeSpan information is automatically transmitted to the Animation Widget.
6 Click (touch) the green ANI button to view the current TimeSpan information for animation.

Selected animation layers control the limits of animation, regardless of the GEO time slider extent. The animation will use these limits regardless of the layer visibility state.

Animation Controls

Once the TimeSpan of a Portal Layer has been identified and set in the registers of the Animation Widget, geobrowser animation can be conducted regardless of the timespans and visibilities of any other layer in the Sidebar. This is a big advance beyond the current time controls provided by Google Earth™ or NASA WorldWind. The animation parameters can be changed during animation by selecting the Portal Layer at any time.

1 Click (touch) and drag the ANI Top Panel (area to the right of letter "Z") to move the ANI Widget anywhere on the screen. The ANI Widget is designed to overlay the GE Time Slider.
2 Click (touch) the ANI Top Panel (area to the right of letter "Z") to show/hide the Animation Play Controls.
3 Right click (press) the Play/Pause button to show/hide the expanded animation controls (not commonly used).
4 REWIND (|<<) will move time slider to beginning of current TimeSpan.
5 STEP REVERSE (<) will move time slider one time step backwards.
6 PLAY/PAUSE controls animation state.
7 STEP FORWARD (>) will move time slider on time step forward.
8 FORWARD/END (>>|) will move time slider to end of current TimeSpan.
9 During animation, right click REWIND (|<<) will slow down animation rate by factor of 2.
10 During animation, right click STEP REVERSE (<) will set animation backward in time.
11 During animation, right click STEP FORWARD (>) will set animation forward in time.
12 During animation, right click FORWARD/END (>>|) will speed up animation rate by factor of 2.

Data Acquisition

The Settings Panel is used to control and monitor connection of OpsTablet to servers and data program products. It monitors the state of communications connectivity, and keeps track of the data volume transferred over each communications channel. Ultimately, the Settings communications state (WiFi vs InMarSat) instructs "Gopher" on which program products to acquire based on the expense/need to acquire. The "Gopher" data acquisition UI has few controls which the normal USER would use, but it is useful to view when checking on the performance of the data acquisition process.

Figure 16A:
FIGS. 16A-E are representations of a primary UI menu for the CID, showing the CID connected to GEO through COM API.
Figure 16B:
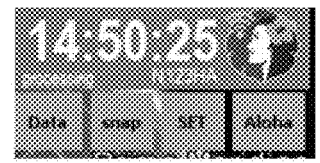
Figure 16C:
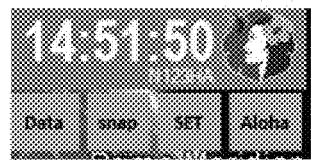
Figure 16D:
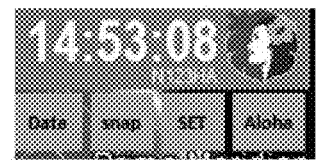
Figure 16E:
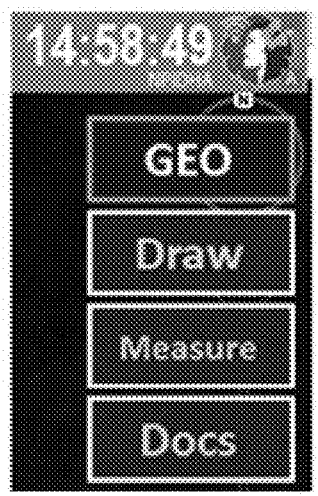
Figure 16F:
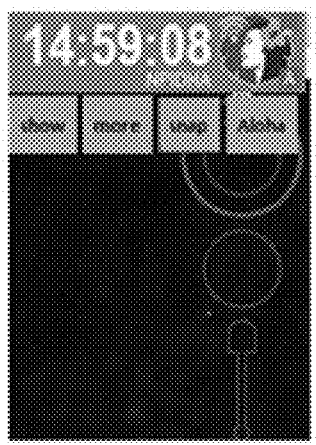
FIG. 16F shows a display control menu.
Figure 16G:
FIG. 16G shows the menu of FIG. 16F, expanded to show a communication menu.

FIGS. 16A-E are representations of a primary UI menu for the CID, showing the CID connected to GEO through COM API. When connected to GEO, additional functions (draw and ad hoc) appear. FIGS. 16A-D show a communication links and processing sequence. A local high speed data link such as WiFi is indicated in FIG. 16A. FIG. 16B indicates data transfer or processing is occurring. FIG. 16C indicates connection is with a restricted bandwidth link such as satellite communication, and FIG. 16D indicates no communication link. FIGS. 16E-G show menu options. FIG. 16E shows a data entry or selection menu. FIG. 16F shows a display control menu. FIG. 16G shows the menu of FIG. 16F, expanded to show a communication menu.

FIGS. 17A-C are representations of expanded control UI menus for the CID, showing the CID's animation player with expanded controls. FIG. 17A shows a 3×3 configuration of the NAV UI. FIG. 17B shows a function in which the animation player is toggled by selecting the play/pause button. FIG. 17C shows a layers panel with 4-dimensional layers are selected and selected layer visibilities are ON. The 4-dimensional layers are used in the animation.

Table 2 depicts a data configuration file ("vlh config file") used to control data on the CID platform:

TABLE 2

| Sample Command | Explanation/Comments |
| --- | --- |
| #OpsTablet(TM) config.ini for version v1e | Config parameters are not case |
| #Copyright 2016 WxOps, Inc. All Rights Reserved. | sensitive, delimited command: |
| #configcid protocol, #targetID = computer name | Param = value = comment |
| aircraftID = N588HA | CID identifier (TailNumber) |
| PIXEL_size = 1920,1200 | screen resolution |
| DPI_size = 1920,1200 | 100% DPI |
| showSettings = false | Settings (Comms) panel on startup |
| showGopher = true | Gopher (Data) panel on startup |
| OpsTab_ShowMenu = false | Primary Menu on startup |
| NAVshow = true | NAV show on Startup |
| PANELShow = true | PANELS (Layers) show on Startup |
| docPath = C:\AIS\EFB\Documents\ | OpsDoc ™ - location of documents |
| LidoPath = C:\Lido\eRouteManual\data\static\enroute\atc | Lido flight plans (coordination) |
| #PIDS | |
| portal = FM11Wx-07 | MyPlaces KML name |
| revert = FM11Wx-07;1,4,7,8,11;1;3,5,6,7,8; | Default layers |
| selectSFC = 4, selectMET = 2, selectTRB = 2, selectGFS = 4 | Default sublayers |
| #gopher | |
| gopher_SAT delta = 20 | Sync time [sec] in SAT mode |
| gopher_WiFi delta = 5 | Sync time [sec] in Cellular mode |
| clear_MasterSync = true | MasterSync startup action |
| askB4purge = false | Manual/Auto purge switch |
| purgeDays = 3 | delete cache older than purgeDays |
| #UTAS AID | |
| AID_IP = 192.168.*.*** | (*** is not published) |
| AID_Status_URL = http://192.168.*.***/services/comm-manager/status | UTAS AID status page URL |
| AID_connectionName= SATCOM | Name shown in Settings panel |
| #OpsTablet | |
| initialUIxy = −200,5 = 0,0 | screen coordinates for primary UI |
| OpsTab_UI_Right = false | Location of Pualani |
| OpsTab_Menu_Right = true | Alignment of Primary menu |
| OpsTab_Size = 133,55 | Primary button size |
| OpsTab_Space = 5 | Primary button spacing (vertical) |
| OpsTab_Forecolor = 255,188,188,188 | Black |
| OpsTab_BackColor = 255,72,25,55 | light blue |
| OpsTab_MouseOver = 255,72,25,55 | light blue |
| OpsTab_Control = 255,128,128,128 | Gray |
| OpsTab_Select_ForeColor = 255,255,255,255 | White |
| OpsTab_Select_BackColor = 255,0,0,255 | Blue |
| OpsTab_Select_BorderColor = 255,0,255,0 | Lime |
| OpsTab_BorderColor = 255,255,255,255 | White |
| OpsTab_Primary_BackColor = 255,64,64,64 | Darkgray |
| OpsTab_BorderSize = 3 | Primary button outline |
| OpsTab_Select_MouseOver = 255,0,0,255 | blue |
| #GEO | |
| GEO_Alias = GEO | Name shown in Primary UI |
| GEO_Target = C:\Program Files (x86)\Google\Google Earth\client\googleearth.exe | Location of geobrowser |
| GEO_Working = C:\Program Files (x86)\Google\Google Earth\client | Working Folder for geobrowser |
| GEO_OpsTabXY = −253,74 = −253,97 | |
| !GEO_Primary BackColor = 255,64,64,64 | darkgray (default is transparent) |
| GEO_timeout = 30 | Abandon connection time [sec] |

TABLE 2-continued

| Sample Command | Explanation/Comments |
|---|---|
| WhackAMole = true | Auto kill miscellaneous windows |
| GEO_kill_ON_exit = false | |
| GEO_initialLayer = Data | Deprecated |
| GEO_Startup = true | Start GEO with OpsTablet ® |
| GEO_Hook = true | Restart GEO if process stopped |

WEB

| Sample Command | Explanation/Comments |
|---|---|
| WEB_Alias = DOC | Namr shown in Primary UI |
| WEB_URL = https://wxops.com | Default home page (URL must be allowed by UTAS AID) |
| WEB_Path_home = index.htm | |
| WEB_Size = 1000,800 | OpsTablet ® browser window size |
| WEB_OpsTabXY = −253,0 | OpsTablet ® windows location |
| Track_Alias = ad_hoc | Name of Flight Plan editor |

Mailx

| Sample Command | Explanation/Comments |
|---|---|
| Mail_Alias = MAILx | Name on Secondary UI |
| Mail_SmtpClient = smtpout.*.* | Not shown |
| Mail_Username = N588HA@***.com | Extracted from EFBconfig.xml |
| !Mail_password = ***** | Not shown |
| Mail_MailTo = wxazygy@wxanalyst.com | Maintenance, send me a postcard |
| Mail_Author = N588HA@***.com | Extracted from EFBconfig.xml |
| Mail_OpsTabXY = −253,0 | Deprecated |

Draw UI

| Sample Command | Explanation/Comments |
|---|---|
| enableHighlight = false | presentations and screen captures |
| Draw_Alias = Draw | Name on Primary UI |
| DRAW_xy = 50,400 | Location of Draw UI |

NAV

| Sample Command | Explanation/Comments |
|---|---|
| NAVdock = true | Docked location for NAV UI |
| NAV_xy = 600,300 | Undocked location for NAV UI |
| NAVlon = −138.840 | degrees (−180 to +180) |
| NAVlat = 28.070 | degrees (−90 to +90) |
| NAVrange = 6980000 | meters |
| NAVtilt = 17 | degrees (0 to 90) |
| NAVazi = 0 | degrees (−180 to +180) |

ANI

| Sample Command | Explanation/Comments |
|---|---|
| ANI_XY = 44,37 | |

PANELS

```
PANELSdock = true
PANELS_xy = 300,200
# banned TopLayers                        Ignore these names in Panels
banned = PIREP_STILLS
banned = WxOps_Portals
banned = Flight_Monitor_8.5.kmz
# PXFR instructions                       CID file system controls
pxfr = prodREQ,request
pxfr = docREQ,request
pxfr = adhocREQ,request
#product/doc transfer table = ID, class, url, dst, {structure, ymd, hh, mm, ptype}
#class = prod
#structure s0 = url + /filename
#structure s1 = url + /yyyyMM/filename
#structure s3 = url + /yyyy/yyyyMM/yyyyMMdd/filename
#structure s4 = url + /yyyy/yyyyMM/yyyyMMdd/hhZ/filename
pxfr = ASigWxF,prod,https://tty1b.com/portal/sigwx,cache, s3,13,22, 0,0,6h,0
pxfr = ASigWxB1,prod,https://tty1b.com/portal/sigwx,cache, s3,14,23, 0,0,6h,0
pxfr = SatIR1af,prod,https://tty1b.com/portal/sat-IR1/af,cache, s0, 1,10,12,0,3h,0
pxfr = SatIR1as,prod,https://tty1b.com/portal/sat-IR1/as,cache, s0, 1,10,12,0,3h,0
pxfr = SatIR1au,prod,https://tty1b.com/portal/sat-IR1/au,cache, s0, 1,10,12,0,30m,0
pxfr = SatIR1eu,prod,https://tty1b.com/portal/sat-IR1/eu,cache, s0, 1,10,12,0,3h,0
pxfr = SatIR1in,prod,https://tty1b.com/portal/sat-IR1/in,cache, s0, 1,10,12,0,3h,0
pxfr = SatIR1jp,prod,https://tty1b.com/portal/sat-IR1/jp,cache, s0, 1,10,12,0,30m,0
pxfr = SatIR1na,prod,https://tty1b.com/portal/sat-IR1/na,cache, s0, 1,10,12,0,30m,0
pxfr = SatIR1np,prod,https://tty1b.com/portal/sat-IR1/np,cache, s0, 1,10,12,0,30m,0
pxfr = SatIR1sa,prod,https://tty1b.com/portal/sat-IR1/sa,cache, s0, 1,10,12,0,3h,0
pxfr = SatIR1sp,prod,https://tty1b.com/portal/sat-IR1/sp,cache, s0, 1,10,12,0,3h,0
pxfr = DTN,prod,https://tty1b.com/portal/DTN/archive,cache, s0, 7,15,17,0,5m,0
pxfr = TB390,prod,https://tty1b.com/portal/TB390,cache, s1, 7,16, 0,0,3h,13
pxfr = TB370,prod,https://tty1b.com/portal/TB370,cache, s1, 7,16, 0,0,3h,13
pxfr = TB340,prod,https://tty1b.com/portal/TB340,cache, s1, 7,16, 0,0,3h,13
pxfr = TB320,prod,https://tty1b.com/portal/TB320,cache, s1, 7,16, 0,0,3h,13
pxfr = TB300,prod,https://tty1b.com/portal/TB300,cache, s1, 7,16, 0,0,3h,13
pxfr = TB100,prod,https://tty1b.com/portal/TB100,cache, s1, 7,16, 0,0,3h,13
pxfr = TSTM,prod,https://tty1b.com/portal/TSTM,cache, s1, 6,15, 0,0,3h,13
```

TABLE 2-continued

| Sample Command | Explanation/Comments |
|---|---|
| pxfr = ICING,prod,https://tty1b.com/portal/ICING,cache, s1, 7,16, 0,0,3h,13 | |
| pxfr = RadAJRB,prod,https://tty1b.com/portal/radar/AJRB,cache, s0, 5,13,15,0,5m,0 | |
| pxfr = RadHGRB,prod,https://tty1b.com/portal/radar/HGRB,cache, s0, 5,13,15,0,5m,0 | |
| pxfr = RadJPRB,prod,https://tty1b.com/portal/radar/JPRB,cache, s0, 5,13,15,0,5m,0 | |
| pxfr = RadUSRA,prod,https://tty1b.com/portal/radar/USRA,cache, s0, 5,13,15,0,5m,0 | |
| pxfr = GFS150,prod,https://tty1b.com/portal/gfs,cache, s3,5,14, 0,0,6h,5 | |
| pxfr = GFS200,prod,https://tty1b.com/portal/gfs,cache, s3,5,14, 0,0,6h,5 | |
| pxfr = GFS250,prod,https://tty1b.com/portal/gfs,cache, s3,5,14, 0,0,6h,5 | |
| pxfr = GFS300,prod,https://tty1b.com/portal/gfs,cache, s3,5,14, 0,0,6h,5 | |
| pxfr = GFS350,prod,https://tty1b.com/portal/gfs,cache, s3,5,14, 0,0,6h,5 | |
| pxfr = GFS400,prod,https://tty1b.com/portal/gfs,cache, s3,5,14, 0,0,6h,5 | |
| pxfr = GFS450,prod,https://tty1b.com/portal/gfs,cache, s3,5,14, 0,0,6h,5 | |
| pxfr = GFS500,prod,https://tty1b.com/portal/gfs,cache, s3,5,14, 0,0,6h,5 | |
| pxfr = GFS700,prod,https://tty1b.com/portal/gfs,cache, s3,5,14, 0,0,6h,5 | |
| pxfr = GFS850,prod,https://tty1b.com/portal/gfs,cache, s3,5,14, 0,0,6h,5 | |
| pxfr = GFS1000,prod,https://tty1b.com/portal/gfs,cache, s3,5,14, 0,0,6h,5 | |
| #class = adhoc | |
| pxfr = File,adhoc,outgoing,C:\EFB\flightplans | |

On startup, the specified items should be derived from EFBconfig.xml. Therefore, EFBconfig.xml will take precedence.

Ad Hoc UI

FIG. 18 is a representation of an ad hoc UI, showing "ad hoc" files downloaded from the server Dispatch Operations server in a file transfer operation. Downloaded files include flight plans (*.txt files) and KML/KMZ. The flight plan can be viewed in a document viewer of the WebUI of the CID.

Ad hoc files are downloaded to the EFB from the data program products server using the manifest and normal gopher file transmission. These files are identified with a localsync and are transmitted only once.

Select a flight plan and click the Open File button. The contents of this txt file will be shown in the doc reader (a web UI)

2D displays for situation awareness (background para) a description of the general technology available to dispatchers and pilots, using existing technology and how it has evolved.

4-dimensional Weather Cube plans, and need for 4-dimensional tools (background para) trends and emerging technology and data that must be accommodated in the near future.

Air-to-Air Communication

The ability of disclosed technology to facilitate communication as either text or other data allows transmission of this data to other aircraft. This can be either through dispatch or directly. The air-to-air communication (either direct of through dispatch) can be provided as text, attachments or a combination of text and attachments. Messages (text) and attachments (files) are exchanged only through the server, and the items exchanged are recorded for analysis and forensic purposes.

While composite radar coverage may be obtained from a ground station (e.g., dispatch), there may be cases in which multiple aircraft staggered along a common flight path may benefit from communicating indications specific to the flight path, such as radar returns, changes in flight status, encountered meteorological conditions and other data.

4-Dimensional Display

Figure 19A:
FIGS. 19A-19C are three frames of the dynamic rendering, it being understood that these figures represent three separate frames of the dynamic display.
Figure 19B:
Figure 19C:

FIGS. 19A-19C are three frames of the dynamic rendering, it being understood that these figures represent three separate frames of the dynamic display. The time period of FIGS. 19A-19C is approximately 3 hours, as compared to the total flight duration of about 10 hours. FIG. 19A is a rendering at 9 Dec. 2015, 0220 UTC, approaching a first potential transported turbulence prediction intersection. FIG. 19B is a rendering at 0347 UTC, approaching a second potential transported turbulence prediction intersection. FIG. 19C is a rendering at 0514 UTC, after transit across the two transported turbulence prediction intersections. These figures represent three separate frames of the dynamic display, providing a visualization of the relevant aspects of the predicted transported meteorological disturbance trajectories. These visualizations provide warnings for the flight crew of the predicted meteorological disturbances. The depicted display is given by way of non-limiting example, as it is expected that there will be various implementations of the disclosed technology.

The three frames of FIGS. 19A-19C present an overlay using a Google Earth™ (GE) geobrowser "animation" showing approximate location of transported turbulence prediction region as a function of time and flight levels. The colored dots show hour-by-hour forecast locations of possible turbulence at Flight Levels 400 (green) 380 (blue) and 360 (red). Red circles with white arrows show intersections between flight tracks and concurrent transported turbulence prediction positions. The 4-dimensional Flight Track for HA451 is shown in light blue 1911, although some mental adjustment is needed in this case since the flight was running about 30 minutes late.

Drawing Controls

Figure 20:
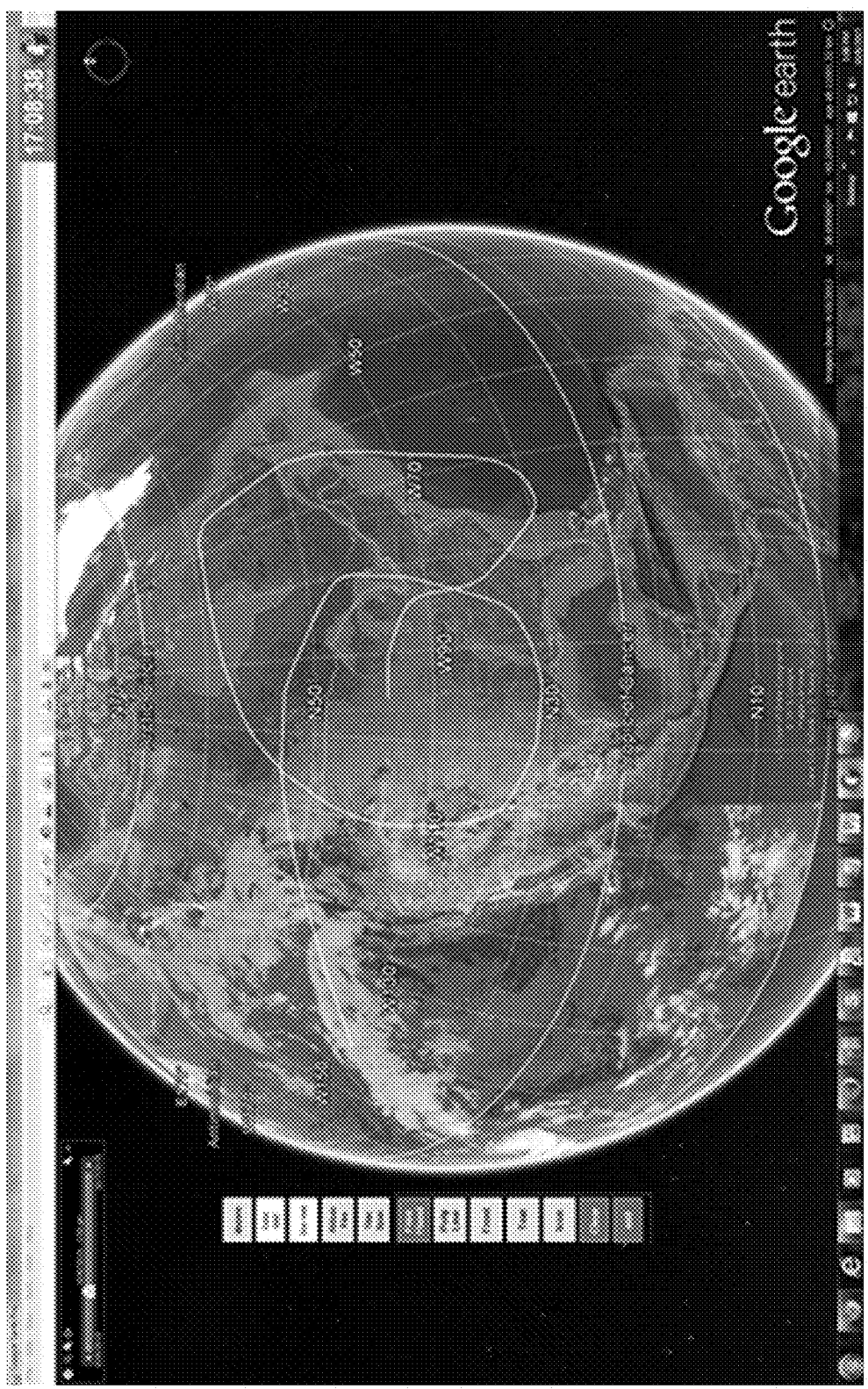
FIG. 20 is a representation of a "Draw UI", which is opened using a "Draw" function when displaying the GEO browser.

FIG. 20 is a representation of a "Draw UI". The "Draw UI" is opened using a "Draw" function when displaying the GEO browser. A full range of interactive graphics commands are provided, which use the KML Engine to provide all graphics as Open OGC KML objects. The "Draw UI" data can be transferred to Dispatch Operations without transferring the GEO browser display.

Drawing controls are implemented by:
1. Click Draw button in Primary UI to access the Draw UI. The GEO is frozen and cannot move.
2. Using default "free hand", use cursor (or finger in touch system) to draw a line on GEO surface.
3. Click Clear to exit Draw without saving edits to KML.
4. Click Exit to commit Draw objects and save edits to KML. These Draw objects will be loaded as "WxOps Overlay" in the Places column of the Layers Panel. Verify that file "WxOps_Overlay.kml" is written to the user's OpsTablet working directory.

KML Production

A KML Production engine is included in the EFB, and is used to create 1. wxops_portal.kml (animated layers)
2. wxops_overlay.kml (draw objects)
3. NOMADS (wind barb stack)
4. WxAzygy® Flight Tracks
5. Flight Tracks generated from Flight Plans (provided by Flight Monitor)
6. wxops_timespan.kml (for animation control)
7. other Features of the Common Operating Environment:

Various 2d charts (situation wall displays) are combined into one visualization. This improves comprehension of cross-factors and reduces user errors of interpolation.

The 4 dimensional structure is modelled and represented as it is (distortions are allowed as long as applied to all components identically)—this is not just "2 dimensions draped on a 3 dimensional world". Analysis tools and derived program products are provided for real time interaction with the 4 dimensional virtual globe environment. 4-dimensional operations are available for display on the EFB. By way of non-limiting example, the 4-dimensional operations may include meteorological conditions, in which case a 4-dimensional depiction of WX operations are available for display on the EFB.

The EFB may have the following capabilities:

Software Item Features:

Touch UI when available and/or support for Mouse if available.

Version 1.0 functions adapted specifically for Google Earth™ Pro.

Uses COM API for Google Earth™ on Windows dotNet.

Intuitive layout designed in coordination with inputs by airline personnel.

Software is configurable without modification using parameters in file "config.ini".

The EFB monitors and reports health and state of geo-browser application.

Displays and updates current time in [hh:mm:ss UTC].

Provides access controls to navigation panel (NAV), compact animation widget (ANI), draw/edit panel (DRAW), and administrative panel (SEND).

Names and colors of Primary UI buttons can be defined through "config.ini" parameters.

Location, names and colors of Animation UI (SI-2) can be defined by "config.ini" parameters.

Animation UI Tables can be defined by "config.ini" parameters, including Table names and animation parameter content.

Visibility panel (SI-3) appears across top of the geo-browser Render Window.

Location, names and colors of Visibility UI (SI-3) can be defined by "config.ini" parameters.

Operation of Data Acquisition Management (SI-4) can be defined by "config.ini" parameters.

Configurable SI-4 parameters will include filters for program product regions and priority.

Static images used in creation of KML graphics (SI-5) can be defined by "config.ini" parameters.

Miscellaneous data used by program product generation UI and algorithms (SI-6) can be defined by "config.ini" parameters.

Animation Widget (ANI) Functions:

Small and Compact Animation Widget (ANI) is same size as native geobrowser "time slider".

ANI overlays the geobrowser's native "time slider".

ANI can be moved by dragging to another location, which reveals the "time slider".

ANI controls animation time boundaries regardless of layer visibilities and time spans.

ANI allows adjustment of animation rate [frames per second].

ANI allows adjustment of animation time step [valid time between frames].

ANI allows user to select forward and reverse animation direction.

ANI allows user to set the time interval that is visible in one frame.

ANI allows user to adjust the amount of time a sequence will pause at end of animation.

ANI provides a named file LIST, which files contain sufficient definitions for animation parameters.

ANI allows user to toggle Play/Pause for any loaded animation sequence.

ANI allows user to step forward and reverse one frame at a time.

ANI runs animation from a table which defines and time and timespan for each frame.

Users can Show/Hide the additional functions by one touch in the ANI UI.

The most common ANI functions are provided in a line of controls below the ANI slider.

Detailed (less common) ANI functions are accessible through pull down panels.

A pull-down panel is provided for user definition of Time Span.

A pull-down panel is provided for user definition of ANI Tables referenced by the LIST function.

A pull-down panel if provided for user definition of time units, including sec, min, hour, and day.

A sliding Time Notification Bar is visible on the ANI Slider to indicate the time currently being displayed (not to be confused with current time displayed in the Primary UI).

Visibility Control (VIS) Functions:

VIS provides touch visibility ON/OFF for selected layers in Sidebar.

VIS allows users to Show/Hide the geobrowser Sidebar.

VIS provides access to a touch friendly version of the geobrowser Sidebar.

VIS provides for deletion of a KML loaded to the temporary places database.

VIS provides a drop down panel with list of layers under each Layer heading.

VIS allows users to move and remember the location of each drop down layer panel.

VIS spreads a drop down layers list horizontally when moved to bottom of Render Window.

Data Acquisition (DAM) Functions

DAM detects and connects automatically to EFB data services when a communication channel is available.

DAM downloads EFB data (KML and data sets) to local archive in background without user interaction.

Locally archived program products remain available in local cache when internet connection is lost.

DAM detects and loads KML from external sources when connected by Internet.

DAM detects and loads KML from email upon notification of arrival.

"Pualani" logo is shown in color when connected, and is shown in Black & White when not connected.

DAM automatically kicks off processing tasks when a targeted data file arrives.

DAM receives data files (such as GFS model grids) which are used to produce KML program products.

Program products are downloaded in order of priority based on product identifier, program product location, and/or program product time.

Program product download priority can be defined by parameters in "config.ini".

DAM will be able to identify when connection is provided through ground ISP.

DAM will be able to identify when connection is provided through Satellite Communications.

Access to DAM controls is provided through the SEND button in the primary UI.

Administrative controls are provided to monitor DAM status and health.

Administrative controls are provided to repair and/or restart the DAM process.

Controls are provided for automatic and/or manual purge of local Cache.

Selected program product transmissions can be blocked in order to conserve communication channel bandwidth.

Communication bandwidth size and rate metrics are saved for airline analysis of EFB operations (Bandwidth Metering).

DAM will support bi-directional single and batch requests/responses between the EFB and the airline flight planning system (flight plan format).

DAM will turn off the Google Earth™ Primary Database when operating remotely to prevent background refreshing of large data files through Satellite communications.

DAM will provide a local map KML in lieu of the geobrowser's Primary Database.

Drawing and Capture (DRAW) Functions

DRAW supports user creation of KML for icons (Image Markers and/or Text), Lines and Polygons.

DRAW supports user creation of multi-segment paths following Great Circles (Lines) between WayPoints (Icons).

DRAW supports user creation of regional polygons with Great Circle radius.

DRAW supports single-click capture of geobrowser screen as image file, and copy to Clipboard.

DRAW supports user definition for altitude in feet or meters in KML for icons (Image Markers and/or Text), Lines and Polygons.

DRAW provides capability for user to measure distance along a Great Circle.

DRAW provides capability for user to measure distance along a segmented track of Great Circles connected at Waypoints.

DRAW allows user selection of units for measure in English (miles, feet) or Metric (km, meters).

DRAW provides user controls for manipulation of KML graphic object color and size.

DRAW provides capability for user to draw and measure along arbitrary surfaces defined by KML objects, including lines, polygons and triangulated layers.

DRAW generates flight track KML from user "click" or entry of waypoint information.

Flight Track lines will have a smooth transition when crossing the International Date Line.

An altitude widget will be provided for user to specify altitude when drawing graphic objects.

Access to DRAW controls is provided through the DRAW button in the primary UI.

DRAW will support graphic production on arbitrary COLLADA surfaces (U.S. Pat. No. 8,392,853).

DRAW will support length measurements along arbitrary COLLADA surfaces (U.S. Pat. No. 8,392,853).

DRAW will allow user to select an arbitrary COLLADA surface for drawing or measuring.

KML Program Production (KMX) Functions

KMX will convert all drawing objects to KML or KMZ for local storage or dissemination.

KMX will create wind barbs and temperatures from gridded GFS model data (gridded data as acquired from EFB data services), global at 5 degree spatial resolution.

KMX will create wind speed and direction from gridded GFS model data (gridded data as acquired from EFB data services), global at 1 degree spatial resolution.

KMX will create flight plan documentation and KML (flight track) from user entered or received information.

KMX will create completed KML or KMZ program products from partial components received via DAM with sufficient information to define the KML program product.

KMX will receive flight plan data, create flight plan program products for, and derive flight plan program products from the Flight Monitor Tool (FMT), Flight Cartography Tool (FCT) and Flight Parameter Tool (FPT) of the airline flight planning system (flight plan format).

Software Load and Update Functions

Flight Data Services will provide "one button click" methods for initial software installation or update.

The EFB software will be available from online source when connected to internet, through portal, or alternate site provided by the airline.

The EFB software will be loadable from a single file (e.g., email or USB drive).

The EFB software load procedures will be similar for Dispatch Operations (Desktops and Laptops) and EFB Tablets.

The EFB software will be capable of distribution through service provided by the airline (e.g., Hawaiian Airlines AirWatch®), or as directed.

A gopher routine is adapted to transfer documents using a similar manifest managed by airline technical publications personnel. The EFB software will be updated to accommodate the additional Document Management functions. The requirement for document receipts is already supported by the "Sync" as post data in the EFB.

Content viewer shall be comprised of single and separate PDF viewer, XML viewer, HTML browser (HTML 5 capable). Cross links shall be available within from PDF, HTML, HTML5, and XML. Table of contents shall allow links to other (separate) files which encapsulates the complete manual. User interface (UI) shall be independent of Content Management program product.

MCM Admin capabilities shall include the ability to create user profiles (by groups) and assign access to content based upon the user profile. (Flight Data Services)

The EFB has ability to create "web page like user interface" or short cut (icon) in order for the end user to access appropriate device applications, documents, and advisories.

Pilots and Dispatchers have the ability to "Push" notifications to alert users of urgent information.

The EFB has the ability to create separate workflows to circulate content and receive confirmation of receipt (end user acknowledgement that information is received). (Flight Data Services)

Optional: Ability to use splash screen to restrict user access to any documents or applications until they confirm reading important company notices.

Within the Content Repository; Ability to create and add folders/subfolders within Content Repository. Ability to upload any form of content with exception of executables. Ability to upload entire folders to the content repository in single action as opposed to copy/save individual files or manuals. (Flight Data Services)

Content repository Document check-in with version control enabled. (Flight Data Services)

Ability to enable/disable Content printing capabilities. (Flight Data Services)

Ability to "stage" content such that new weather and document content is enabled on set date/time (GMT) and older content is expired and automatically removed or disabled (no longer visible to device user). (Flight Data Services)

Ability to "Push" (Auto-download) content to device without user intervention. When this is done an indicator is created on the device to indicate new/revised content. Ability to display Splash screens on device alerting users of new/revised content. (Flight Data Services)

Download start/stop/resume capability shall be enabled.

Ability to upload/download documents via any wireless or Aircraft Interface Devices (AID). Ability to access data online or offline. (Flight Data Services)

Ability for Repository files to link PDF to PDF or HTML to PDF. (Flight Data Services)

Allow third party applications to access data downloaded to user's device.

The ability to combine updates with flight plan data provides several functions that allow review of cockpit and controller (including dispatch) procedures. The actual events involving an aircraft and its flight history can be recreated, using the actual flight history obtained through the synchronization of the operating plan. This allows re-construction of events in order to train controllers. The re-construction of events also provides an ability to analyze the actual flight to determine events and circumstances of flight. This is useful for determining the circumstances of an adverse event, and makes it possible to track missing aircraft in hindsight.

The controller facility or dispatch controller facility is thereby able to recreate a facsimile of the in-vehicle display provides a capability of analyzing events using the stored data. Previous operational plans stored with dispatch or another control facility permit a controller to perform forensic or analytical investigations or analysis based on the information previously stored, as updated by the updates.

Functionality

The disclosed technology provides an integrated system comprising data acquisition and program product generators, data communication portals, monitoring utilities, and various general purpose computer platforms, for the generation, transmission, acquisition, storage, display and manipulation of data and documents to support mobile transportation operations and logistics using an EFB.

The EFB may use hand-held tablets (PID), mounted cockpit tablets (CID), and desktop or laptop computers for Dispatcher and related applications. The system may use operations and logistics layers, such as geographic and operational boundaries, navigational charts, and aircraft positions for an entire fleet. Dispatcher layers can be provided, such as hand-drawn alerts and notations, or ancillary program products delivered through digital media including email to specific EFB platforms. Aviation hazard layers including latest information for significant weather (SIGMETS), lightning, radar, satellite imagery, convective SIGMETS, PIREPS, tropical cyclone predictions, and other meteorological data. Animated layers may prove 4-dimensional displays and predictions, including predictions for significant weather, lightning, radar, satellite imagery, model-based predictions of convection, icing, turbulence and winds at selected altitudes, and flight plans for selected aircraft. The data communication methods can comprise a normal "always on" bi-directional internet connectivity using cost constrained high bandwidth communication channels, and a "send once" communications protocol for intermittent or high cost bi-directional connectivity which allows continued and sustained operations when communications connectivity is lost or degraded. Additional data compression which reduces bandwidth and therefore overall costs of data transmission for each program product item transmitted.

Monitoring utilities can comprise reporting of aircraft (vessel, ground vehicle, ship or rail) position (such as GPS coordinates) and flight deck data as allowed by regulations. Additionally, status and health of computer platforms and currency (age) of data program products and managed documents can be monitored. Monitoring may include monitoring of communications channel statistics or each computer platform including bandwidth consumption and transmission latency.

The computer platforms may comprise desktop systems for full dispatcher operations while connected to low cost high-bandwidth internet, portable tablet devices for pilot ground operations while connected to internet (PID), and dedicated cockpit devices for flight operations with potentially intermittent connection to internet when connected by satellite or radio (CID).

The common operating environment (COE) uses a virtual globe or geobrowser technology, which can be implemented on the compute platforms. The implementation enables the use of a combination of multiple disparate data program products and visualizations into one Common Operating Environment such as a 4-dimensional virtual globe visualization. This improves comprehension of cross-factors and reduces user errors of spatial and temporal interpolation. This allows modeling and representation of the 4 dimensional structure of atmospheric and environmental conditions and hazards as would be encountered in the real 4 dimensional world and represented "as it is", and where spatial and temporal distortions are allowed as long as these are applied to all components identically. This further allows all users of the integrated system to have access to the same data at the same time. The technology provide still or animated graphical depiction of a vehicle's current or projected position, fuel, route, waypoints, destination and alternates, and can provide Estimated Time of Arrival (ETA), Estimated Fuel at Arrival (EFA) and weather predictions at each way point.

The disclosed technology provides a human factors method to visualize information in the time dimension (4-dimensional) and to compensate for varied valid times in different data program products. This provides a global begin and end timespan for animation may be set or adjusted based upon selection of a 4-dimensional program product layer (ANI).

The disclosed technology supports great circles on a visualization of a globe surface, down-range and up-range path distance measuring above and below the surface of a 4-dimensional virtual globe or geobrowser, and interactive creation or editing of a flight plan. Interactive flight plans may be submitted to an external Flight Monitor service for creation or modification of approved flight plans. The technology allows analysis and creation or editing of derived program products for real time interaction with the 4-dimensional virtual globe or geobrowser environment (DRAW), comprising freehand lines, cardinal points constrained lines and polygons, and icons with or without text, polygons and contours with spline smoothing, fronts and 3-dimensional symbols, and editing of DRAW objects, such as definition of object altitude and timespan for animation.

The disclosed technology provides a centralized data sever and portal for acquisition of operational and environmental data from aircraft pilots, dissemination of current and archived data program products and documents to all COE platforms as needed, and monitoring of status and health of system, subsystems and individual COE platforms.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

While the examples given are applicable for airline flight operations, the disclosed techniques can be used for other forms of vehicle operations in which control or dispatch from a remote location is used. This may apply to other activities for aviation and aerospace operations, as well as operations of other types of vehicles such as trucks, boats, rail and other dispatch-controlled vehicles.

The description of "dispatch" may be applied to other controllers or forms of control, such as aircraft controllers and operations control centers.

What is claimed is:

1. A common operating environment (COE) display system for vehicle operations providing coordination of logistics information among transportation elements used to support mobile transportation operations and logistics, the COE comprising:
    an operational plan store for storing data for a vehicle operational plan such as a flight plan or other operational data describing vehicle deployment;
    a map visualization system storing and displaying a visualization of a map region;
    an in-vehicle display:
        depicting the operational plan,
        providing displays of current and projected operational conditions of the vehicle and its environment within different time phases of the operational plan, wherein the in-vehicle display comprises a map visualization output providing said visualization of the map region, and
        generating and displaying a mapped representation of the operational plan and logistics on the visualization of the map;
    a synchronization module comprising a data communication portal, the synchronization module providing and receiving updates of the operational plan,
        whereby the updates provide changed data to the operational plan thereby allowing synchronization of the operational plan with a remotely located control facility; and
    an operational plan modification module generating a new or modified operational plan or modifying the stored data for the vehicle operational plan,
        whereby the synchronization module provides the new or modified operational plan or modifications of the stored data to the remotely located control facility, permitting review of the new or modified operational plan; and
    a utility to allow an operator of the in-vehicle display to forward communication of text or other data allows transmission to other vehicles by transmitting the data to the remotely located control facility, the forwarded communication selectively comprising text, attachments or a combination of text and attachments.

2. The COE display system of claim 1, further comprising:
    a data acquisition generator; and
    a data monitoring module and monitoring utility, providing generation, transmission, acquisition, storage, display and manipulation of data and documents to support mobile transportation operations and logistics comprising the operational plan and map visualization suitable for display on a cockpit interactive device (CID) or personal interactive device (PID) using a hand-held tablet or laptop computer or a mounted cockpit tablet.

3. The COE display system of claim 2, wherein the monitoring utility comprises:
    a position reporting function;
    a vehicle operational status monitoring function;
    a data status and health monitoring function providing data and status monitoring of computer platforms and currency (age) of data and managed documents; and
    a communications channel statistics function for the computer platform providing information on bandwidth consumption and transmission latency.

4. The COE display system of claim 1, wherein the operational plan store and map visualization system further comprise:
    operations and logistics layers (OPS) comprising geographic and operational boundaries, navigational charts, vehicle support information, and vehicle positions for plural vehicles within a fleet;
    dispatcher layers (DSP) comprising hand-drawn alerts and notations and ancillary information, comprising email and email attachments to the specific COE display system;
    hazard layers (HAZ), comprising information for weather, airport and ATC information obtained from company and government reporting and prediction sources; and
    animated layers (4-dimensional layers), comprising predictions or observations for the hazard layers, permitting time adjustment of the predictions in association with the displays of current and projected operational conditions as modified by operator adjustments in the vehicle operational plan.

5. The COE display system of claim 1, wherein a data communication portal comprises:
    normal "always on" bi-directional network connectivity using at least one cost constrained high bandwidth communication channel; and
    "send once" communications protocol connectivity using intermittent or high cost bi-directional connectivity which allows continued and sustained operations during loss of communications for normal "always on" connectivity, whereby the forwarded communication of text or other data implements communication according to the normal "always on" bi-directional network connectivity or the "send once" communication protocol connectivity according to the availability of normal "always on" connectivity.

6. The COE display system of claim 1, further comprising:
   the visualization of the map region provided by a virtual globe or geobrowser providing:
   multiple disparate data program products and visualizations integrated into a 4-dimensional virtual globe visualization providing an integration of display to reduce a need for operator spatial and temporal interpolation; and
   modeling and representation of the 4-dimensional information to depict atmospheric and environmental conditions and hazards as would be encountered along the different time phases of the operational plan, while allowing spatial and temporal distortions (e.g., altitude) in a manner applied to all components substantially identically.

7. The COE display system of claim 1, further comprising:
   animation tools providing a human factors method to visualize information in a time dimension and to compensate for varied valid times from different time estimations; and
   the animation tools providing an ability to set or adjust global begin and end timespan for animation.

8. The COE display system of claim 1, further comprising:
   the in-vehicle display using the visualization of the map region to selectively provide still or animated graphical depictions of the vehicle's current or projected position, fuel, route, waypoints, destination and alternates, estimated time of arrival (ETA), estimated fuel at arrival (EFA) and weather predictions at each way point.

9. The COE display system of claim 1, further comprising:
   enabling graphic analysis, and
   creation or editing for real time interaction with a 4-dimensional visualization of the map region,
   the graphic generation tools comprising a capability of rendering, on the visualization of the map region:
   freehand lines, cardinal points constrained lines and polygons, and icons with or without text,
   polygons and contours with spline smoothing,
   fronts and 3-dimensional symbols,
   editing of objects, including definition of object altitude and timespan for animation, and
   support for rendering the graphic generation along great circles on the globe, down-range and up-range path distance measuring above and below the surface of a 4-dimensional virtual globe, and interactive creation or editing of the flight plan or other operational data describing vehicle deployment,
   the graphic generation tools permitting the submission of the created or edited graphic analysis as at least a portion of the generated a modified operational plan.

10. The COE display system of claim 1, further comprising:
    logistics support, wherein the synchronization provides data used to maintain and report status of documents and manuals required for flight operations;
    the in-vehicle display comprises a quick look panel to support rapid "go/no go" decision for flight readiness; and
    wherein manual remediation as initiated by the user can repair the "no go" status for individual documents or data.

11. A system for vehicle operational management comprising:
    a common operating environment (COE) display system for vehicle operations providing coordination of logistics information among transportation elements used to support mobile transportation operations and logistics, the COE comprising:
    an operational plan store for storing data for a vehicle operational plan such as a flight plan or other operational data describing vehicle deployment;
    a map visualization system storing and displaying a visualization of a map region;
    an in-vehicle display:
        depicting the operational plan,
        providing displays of current and projected operational conditions of the vehicle and its environment within different time phases of the operational plan, wherein the in-vehicle display comprises a map visualization output providing said visualization of the map region, and
        generating and displaying a mapped representation of the operational plan and logistics on the visualization of the map;
    a synchronization module comprising a data communication portal, the synchronization module providing and receiving updates of the operational plan,
        whereby the updates provide changed data to the operational plan thereby allowing synchronization of the operational plan with a remotely located control facility;
    an operational plan modification module generating a new or modified operational plan or modifying the stored data for the vehicle operational plan,
        whereby the synchronization module provides the new or modified operational plan or modifications of the stored data to the remotely located control facility, permitting review of the new or modified operational plan; and
    a utility to allow an operator of the in-vehicle display to forward communication of text or other data allows transmission to other vehicles by transmitting the data to the remotely located control facility, the forwarded communication selectively comprising text, attachments or a combination of text and attachments; and
    a dispatcher operation display system:
        communicating with the COE display system with potentially intermittent connection to internet when connected by satellite or radio to a cockpit interactive device (CID) or a personal interactive device (PID), with a capability of effecting communication using the normal "always on" bi-directional network connectivity and the "send once" communications protocol connectivity,
        and further maintaining data providing communications channel statistics for the dispatcher operation display system comprising bandwidth consumption and transmission latency.

12. A system for vehicle operational management comprising:
    a common operating environment (COE) display system for vehicle operations providing coordination of logistics information among transportation elements used to support mobile transportation operations and logistics, the COE comprising:
an operational plan store for storing data for a vehicle operational plan such as a flight plan or other operational data describing vehicle deployment;
a map visualization system storing and displaying a visualization of a map region;
an in-vehicle display;
depicting the operational plan,
providing displays of current and projected operational conditions of the vehicle and its environment within different time phases of the operational plan, wherein the in-vehicle display comprises a map visualization output providing said visualization of the map region, and
generating and displaying a mapped representation of the operational plan and logistics on the visualization of the map;
a synchronization module comprising a data communication portal, the synchronization module providing and receiving updates of the operational plan, whereby the updates provide changed data to the operational plan thereby allowing synchronization of the operational plan with a remotely located control facility;
an operational plan modification module generating a new or modified operational plan or modifying the stored data for the vehicle operational plan, whereby the synchronization module provides the new or modified operational plan or modifications of the stored data to the remotely located control facility, permitting review of the new or modified operational plan; and
a utility to allow an operator of the in-vehicle display to forward communication of text or other data allows transmission to other vehicles by transmitting the data to the remotely located control facility, the forwarded communication selectively comprising text, attachments or a combination of text and attachments; and
a centralized data server and portal for:
acquisition of operational and environmental data from vehicles and vehicle operators,
dissemination of current and archived data program products and documents to all COE platforms as needed, and
monitoring of status and health of system, subsystems and individual COE platforms,
wherein the centralized data server and portal synchronizes each of at least a subset of the COE display systems with the centralized data server.

13. The system of claim 12, further comprising the data server transmitting and receiving communication of data during regular synchronization, the data comprising:
operational logistics data obtained from flight deck systems;
on board radar data;
the data server:
acquiring data from individual operational platforms, and
returning composite data program products for dissemination to the COE display systems,
the data comprising:
airborne radar composite created from multiple aircraft;
meteorological information derived from flight deck data including winds, turbulence, and other meteorological information; and
adjustments to flight hazard transport trajectory predictions for flight path intersection with tracers and plumes undergoing long-range atmospheric transport.

14. A common operating environment (COE) display system for a controller providing a controller or dispatcher function at a vehicle operations controller facility or dispatch controller facility, and to support mobile transportation operations and logistics providing coordination of logistics information among transportation elements, the COE comprising:
a data communication portal connecting to at least one a high bandwidth communication channel and a communication channel,
the data communication portal using communication protocol connectivity using intermittent or high cost bi-directional connectivity for communicating with at least one vehicle display unit located in or positionable in a vehicle;
an operational plan store for storing data for receiving at least one vehicle operational plan such as a flight plan or other operational plan describing vehicle deployment;
a map visualization system displayed on a controller display and storing and displaying a visualization of one or more map regions corresponding to map regions displayed on display systems in the vehicles;
the controller display:
depicting the operational plan, and
providing displays of current and projected operational conditions of the vehicle within different time phases of the operational plan,
wherein the controller display comprises a map visualization output:
providing said visualization of the map region, and
generating and displaying a mapped representation of the operational plan and logistics on the visualization of the map
a synchronization module comprising the data communication portal, the synchronization module providing and receiving updates of the operational plan by exchanging update data with the vehicle display units, whereby the updates provide changed data to the operational plan, thereby
allowing synchronization of the operational plan with the vehicle display units and enabling the vehicle operations controller facility or dispatch controller facility to recreate a facsimile of the in-vehicle display
an operational plan modification module
receiving and generating a new or modified operational plan, or
receiving and generating modifications of the stored data for the vehicle operational plan,
whereby the synchronization module provides the modified operational plan or modifications of the stored data to the remotely located control facility, permitting review of the modified operational plan; and
a utility to forward communication of text or other data allows transmission between vehicles by receiving the data at the vehicle operations controller facility or dispatch controller facility, the forwarded communication selectively comprising text, attachments or a combination of text and attachments.

15. An aviation flight planning system comprising a common operating environment (COE) display system for vehicle operations for displaying route or flight paths on a 4-dimensional map visualization display, comprising:
a coordinating computer located on board an aircraft receiving sensed data from sensing equipment on board the aircraft providing real time sensed information;
an operational plan store for storing data for a vehicle operational plan such as a flight plan or other operational plan describing vehicle deployment communicatively connected to the coordinating computer;
an in-vehicle display:
depicting the operational plan,
providing displays of current and projected operational conditions of the vehicle within different time phases of the operational plan, wherein the in-vehicle display comprises a map visualization output providing said visualization of the map region, and
generating and displaying a mapped representation of the operational plan on the visualization of the map;
a synchronization module comprising a data communication portal, the synchronization module:
providing and receiving updates of the operational plan, thereby allowing synchronization of the operational plan with a remotely located control facility the in-vehicle display proving a visualization system configured to:
acquire at least one route or flight track as a focus object,
acquire at least one predicted object or occurrence as a predicted focus object,
use focus object information to display at least a plurality of the focus objects,
subdivide each focus object into a plurality of object components,
use a transparent interface to calculate coordinates of components of the focus object in a coordinate system of the visualization system, said focus object mutually shared by the visualization system and the interface,
receive coordinates of a point of interest (POI) used in a projection of the visualization system, and
project the POI in a selected point of view (POV) using the calculated coordinates and the received coordinates of the POI in the projection of the visualization system of N dimensional features in the visualization, independent of user point of view and time-adjusted according to current and predicted flight status along the flight track and adjusted by time; and
a communication module to allow an operator of the in-vehicle display to forward communication of text or other data allows transmission to other vehicles by transmitting the data to the remotely located control facility, the forwarded communication selectively comprising text, attachments or a combination of text and attachments.

16. The aviation flight planning system according to claim 15, wherein:
the visualization system presents information about the focus objects with or without user interaction; and
the visualization system:
displays the relevant aspects of the predicted focus object as an indication for the flight crew without user interaction, and
automatically generates the indication upon detection of an intersection of the flight track with the predicted focus object within a predetermined time period.

17. The aviation flight planning system according to claim 15, wherein:
the transmitted data received on board the aircraft comprises data selected from the group selected from observations, modeling, source strength, time range of occurrence, and altitude for injection of hazardous material or precursors, and
the visualization system presents information about the focus objects with or without user interaction.

18. The aviation flight planning system according to claim 15, wherein
the data communication portal provides normal "always on" bi-directional network connectivity using at least one cost constrained high bandwidth communication channel; and wherein
the data communication portal provides "send once" communications protocol connectivity using intermittent or high cost bi-directional connectivity which allows continued and sustained operations during loss of communications for normal "always on" connectivity, whereby the "air-to-air" communication implements communication according to the normal "always on" bi-directional network connectivity or the "send once" communication protocol connectivity according to the availability of normal "always on" connectivity.

19. The aviation flight planning system according to claim 15,
a transported meteorological disturbances model store providing the coordinating computer with data modelling transported meteorological disturbances, with the received transmitted data and the sensed data to:
use the data modelling transported meteorological disturbances to correlate the sensed data and received transmitted data to identify transported meteorological disturbances source characteristics,
identify predicted transported meteorological disturbances trajectories from source to intersection with a vehicle or flight path indicated by the flight plan in space and time and communicate relevant aspects of the predicted transported meteorological disturbances trajectories, and
display the route or flight path and the relevant aspects of the predicted transported meteorological disturbances trajectories as warnings for the flight crew.

* * * * *

UNITED STATES PATENT AND TRADEMARK OFFICE
CERTIFICATE OF CORRECTION

PATENT NO. : 9,916,764 B2  
APPLICATION NO. : 15/614042  
DATED : March 13, 2018  
INVENTOR(S) : Scott T. Shipley and Mark D. Spence Page 1 of 1

It is certified that error appears in the above-identified patent and that said Letters Patent is hereby corrected as shown below:

On the Title Page

Item (73), delete "WXPOS, INC." and replace with "WXOPS, INC."

Signed and Sealed this  
First Day of May, 2018

Andrei Iancu  
*Director of the United States Patent and Trademark Office*